(12) United States Patent  
De Meersman et al.

(10) Patent No.: US 9,116,256 B2  
(45) Date of Patent: Aug. 25, 2015

(54) METHOD AND DEVICE FOR WAVE FIELDS SEPARATION IN SEISMIC DATA

(75) Inventors: Kristof De Meersman, Calgary (CA); Bruce Mattocks, Katy, TX (US)

(73) Assignee: CGGVERITAS SERVICES (U.S.) INC, Houston, TX (US)

(*) Notice: Subject to any disclaimer, the term of this patent is extended or adjusted under 35 U.S.C. 154(b) by 978 days.

(21) Appl. No.: 13/184,827

(22) Filed: Jul. 18, 2011

(65) Prior Publication Data

US 2013/0021873 A1 Jan. 24, 2013

(51) Int. Cl.
*G01V 1/38* (2006.01)
*G01V 1/36* (2006.01)

(52) U.S. Cl.
CPC ... *G01V 1/36* (2013.01); *G01V 1/38* (2013.01); *G01V 2210/144* (2013.01); *G01V 2210/46* (2013.01); *G01V 2210/56* (2013.01)

(58) Field of Classification Search
CPC ..... G01V 1/36; G01V 1/38; G01V 2210/144; G01V 2210/46; G01V 2210/56
USPC .......................................................... 367/24
See application file for complete search history.

(56) References Cited

U.S. PATENT DOCUMENTS

| 4,760,563 A * | 7/1988 | Beylkin ........................ 367/73 |
| 4,992,992 A | 2/1991 | Dragoset, Jr. |
| 6,721,662 B2 | 4/2004 | Wood |
| 7,164,619 B2 * | 1/2007 | Robertsson et al. ............ 367/21 |
| 2008/0221801 A1 | 9/2008 | Craft et al. |

FOREIGN PATENT DOCUMENTS

EP 2375268 A1 10/2011

OTHER PUBLICATIONS

GB Search Report mailed on Oct. 30, 2012, in related GB Application No. GB1212700.7.
Lasse Amundsen et al., "Decomposition of multicomponent sea-floor data into upgoing and downgoing P—and S-waves", GEOPHYSICS, Mar.-Apr. 1995, pp. 563-572, vol. 60, No. 2.

* cited by examiner

*Primary Examiner* — Daniel L Murphy
(74) *Attorney, Agent, or Firm* — Patent Portfolio Builders PLLC

(57) ABSTRACT

Apparatus, computer instructions and method for processing seismic data related to a subsurface of a body of water. The method includes receiving input data for a vertical direction and radial direction and/or from a hydrophone, applying a radon transform to the input data, separating primary signals from ghosts signals based on the vertical and radial components, applying an inverse radon transform to determine up-going and down-going wave fields in a time-distance domain, and separating interfering up-going and down-going wave fields that are recorded by the same receivers.

22 Claims, 24 Drawing Sheets

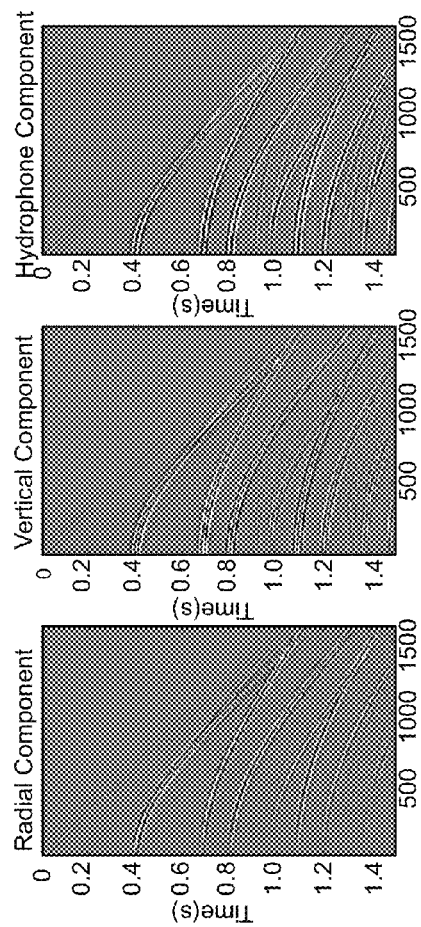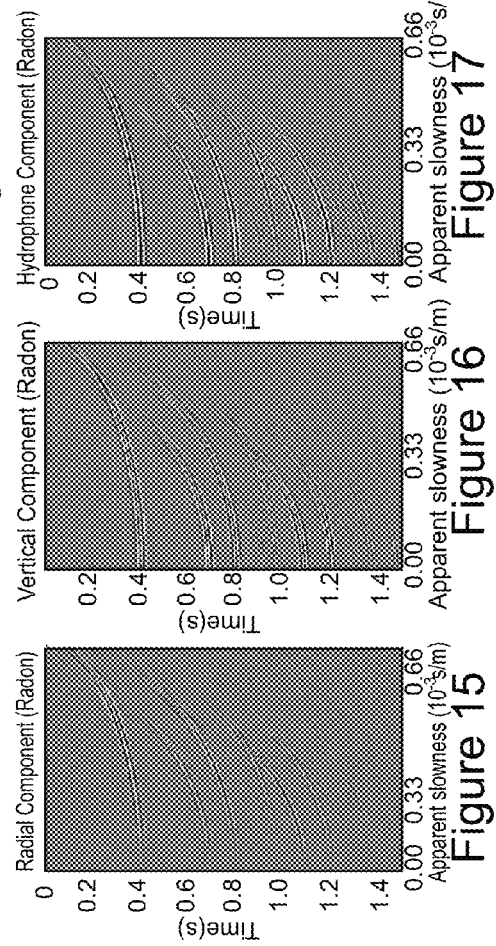

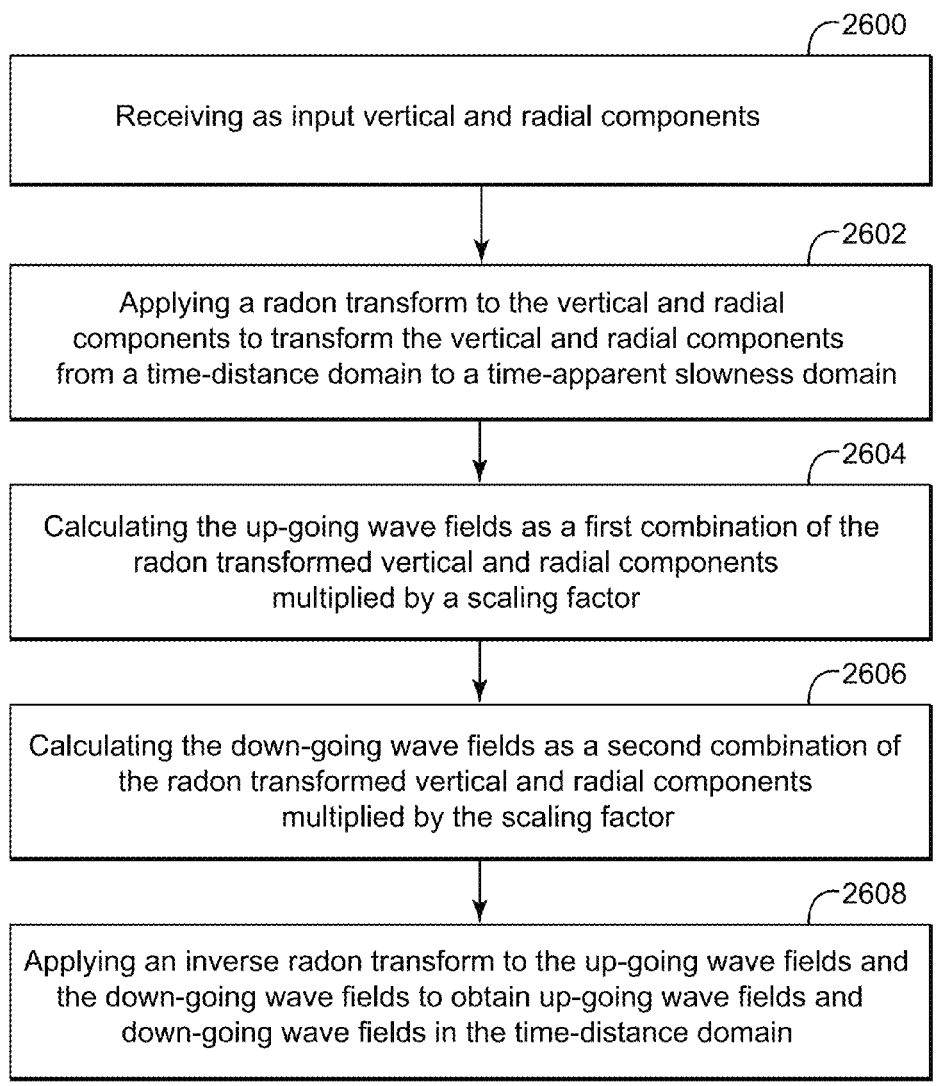

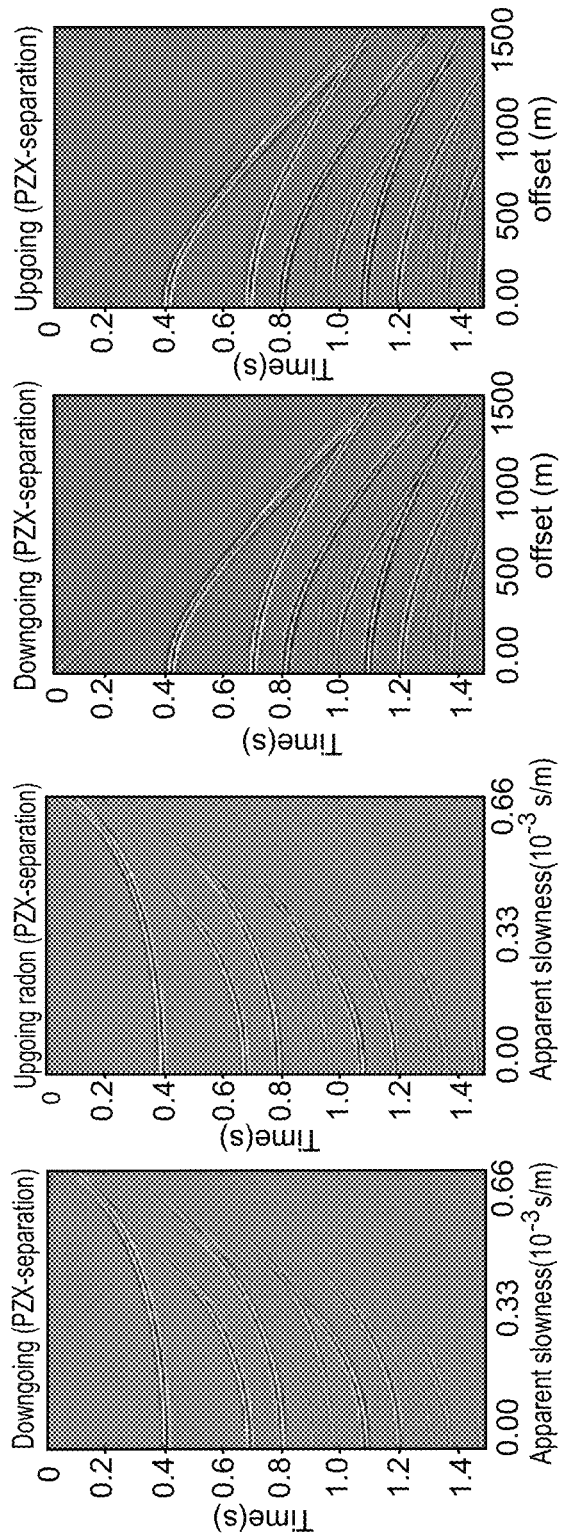

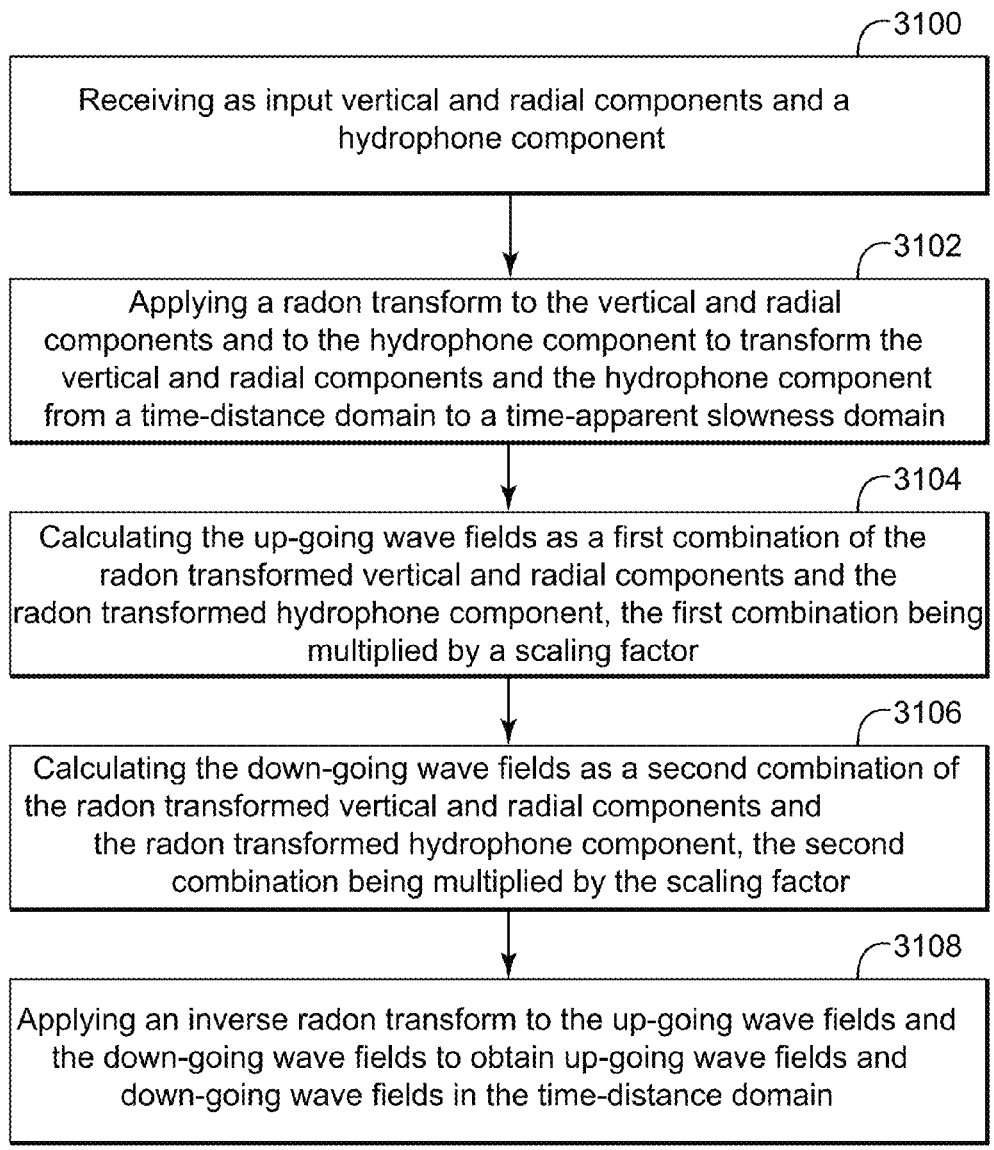

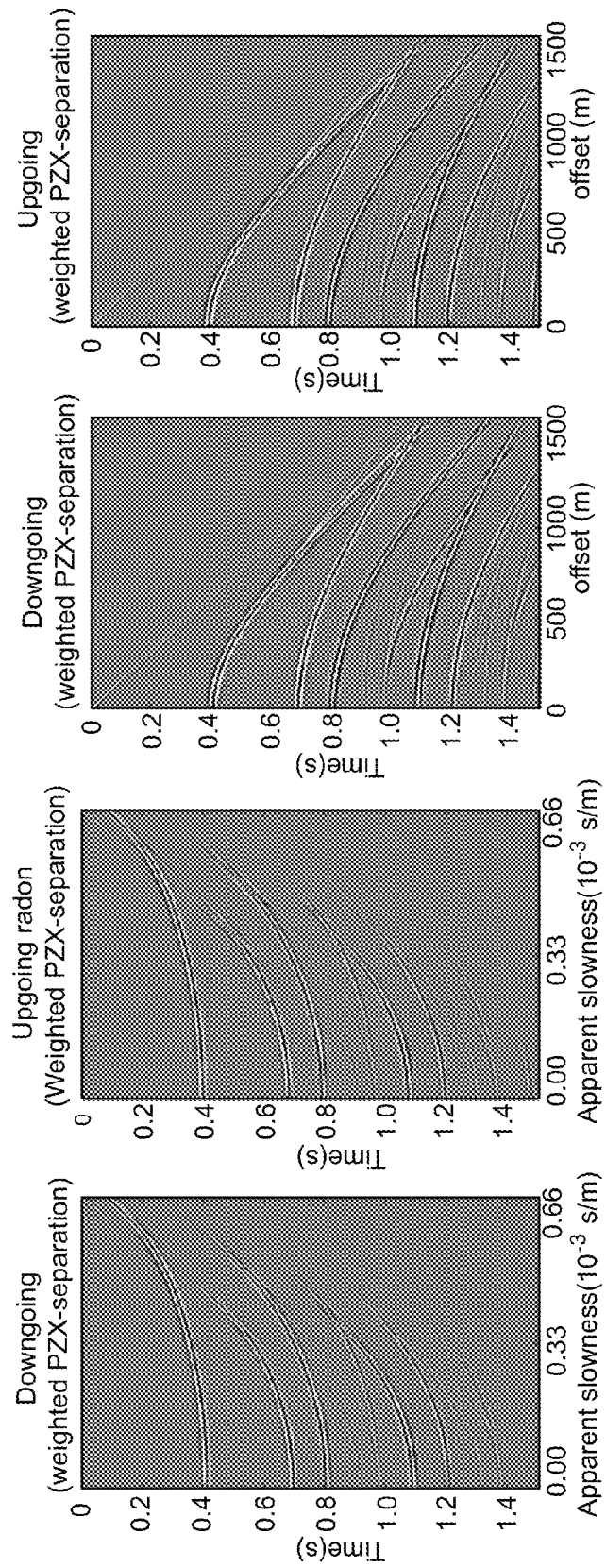

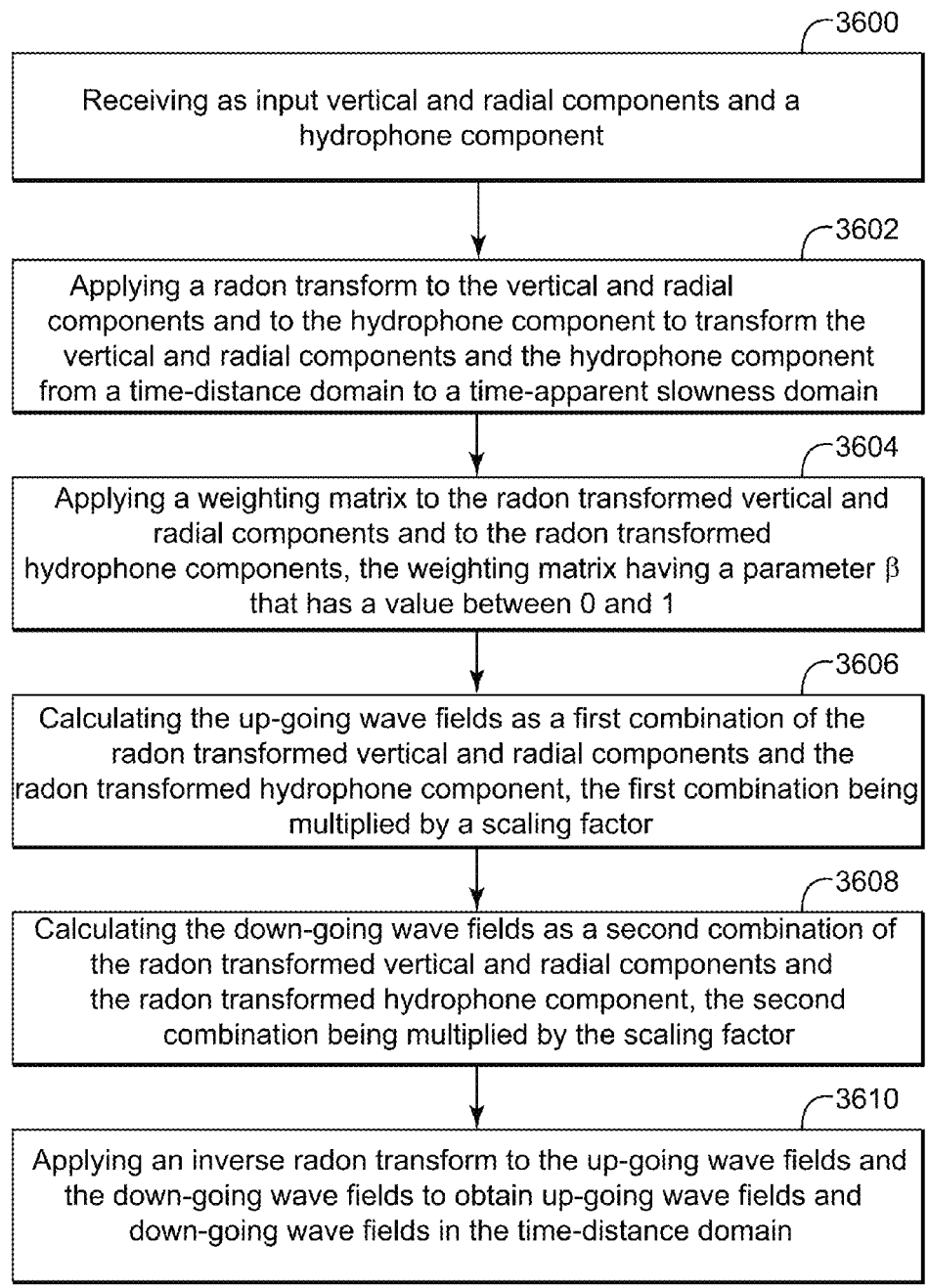

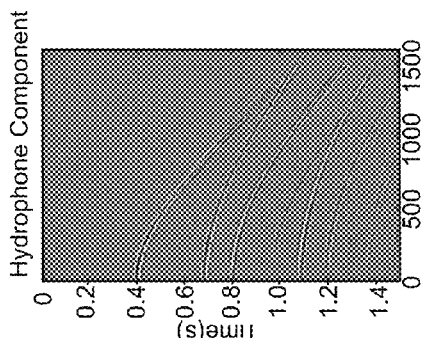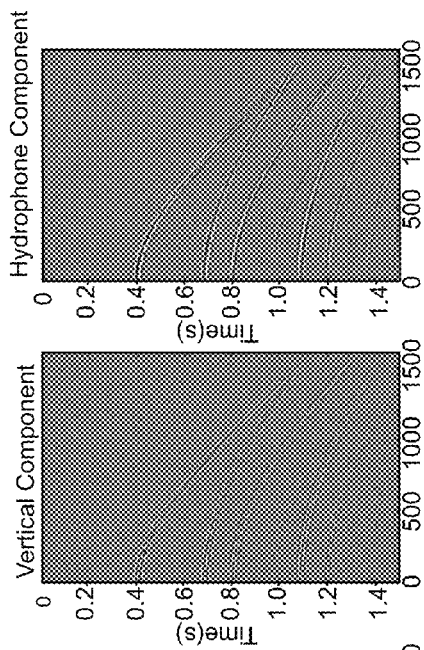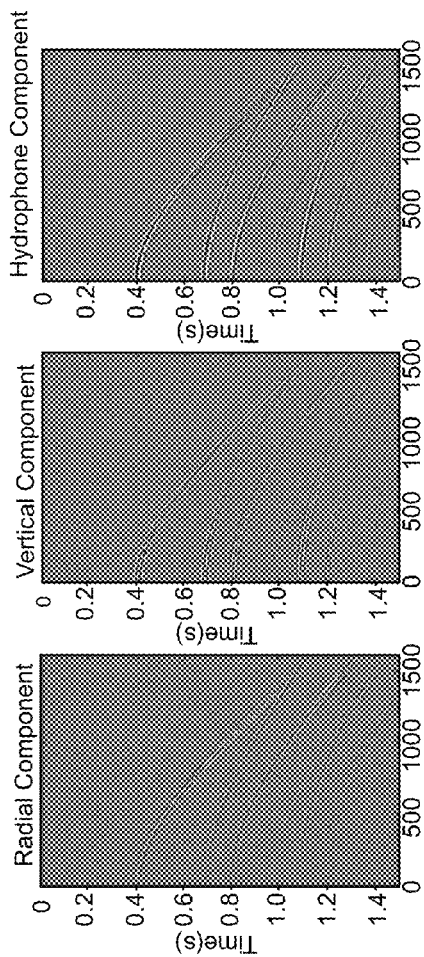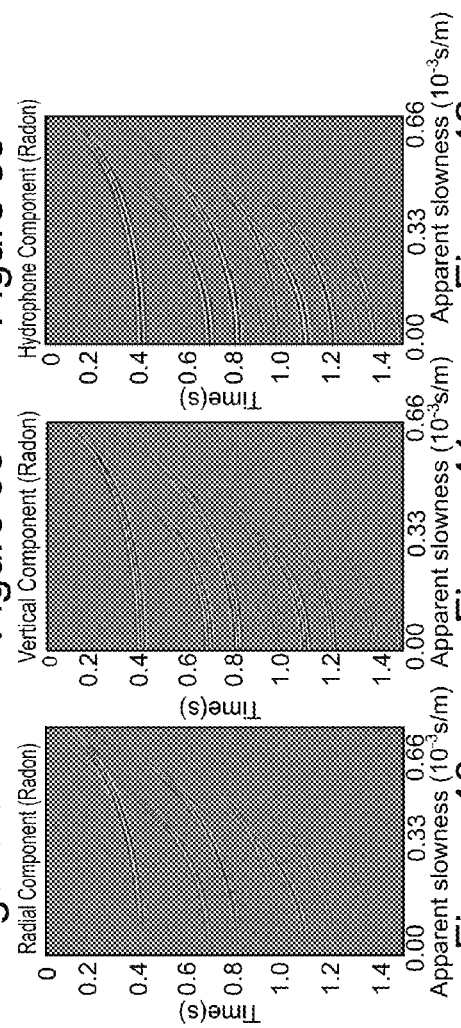

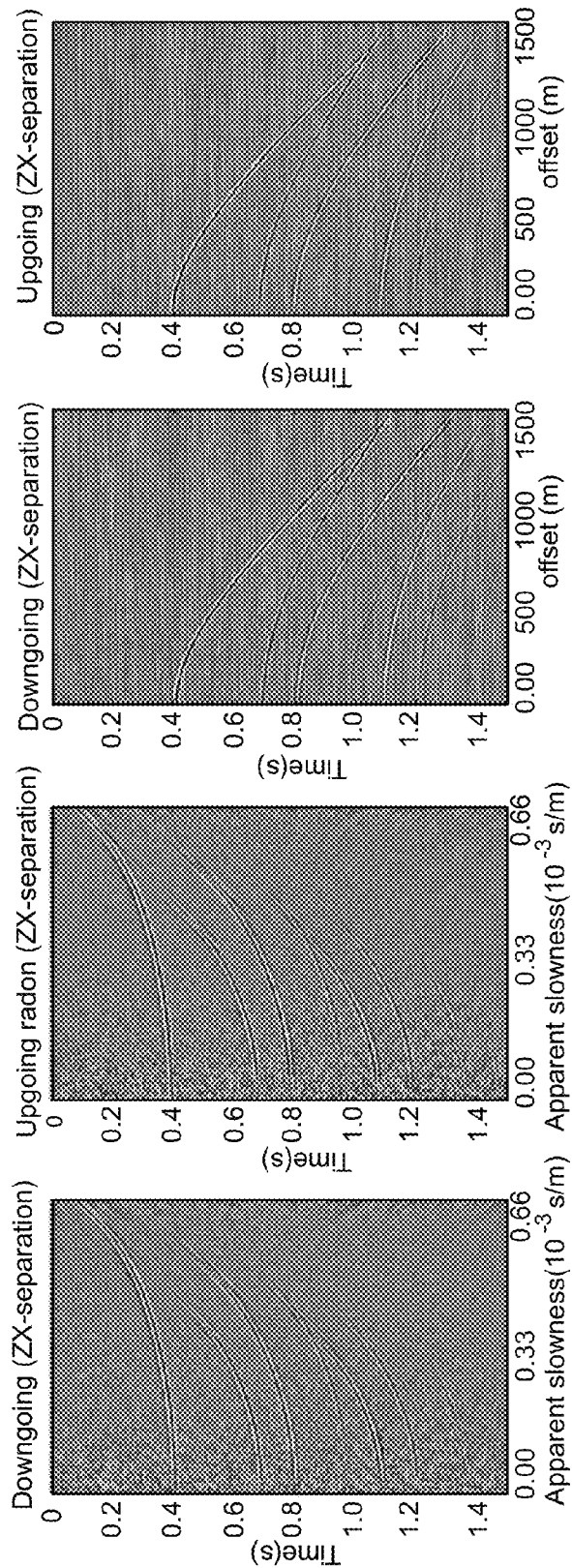

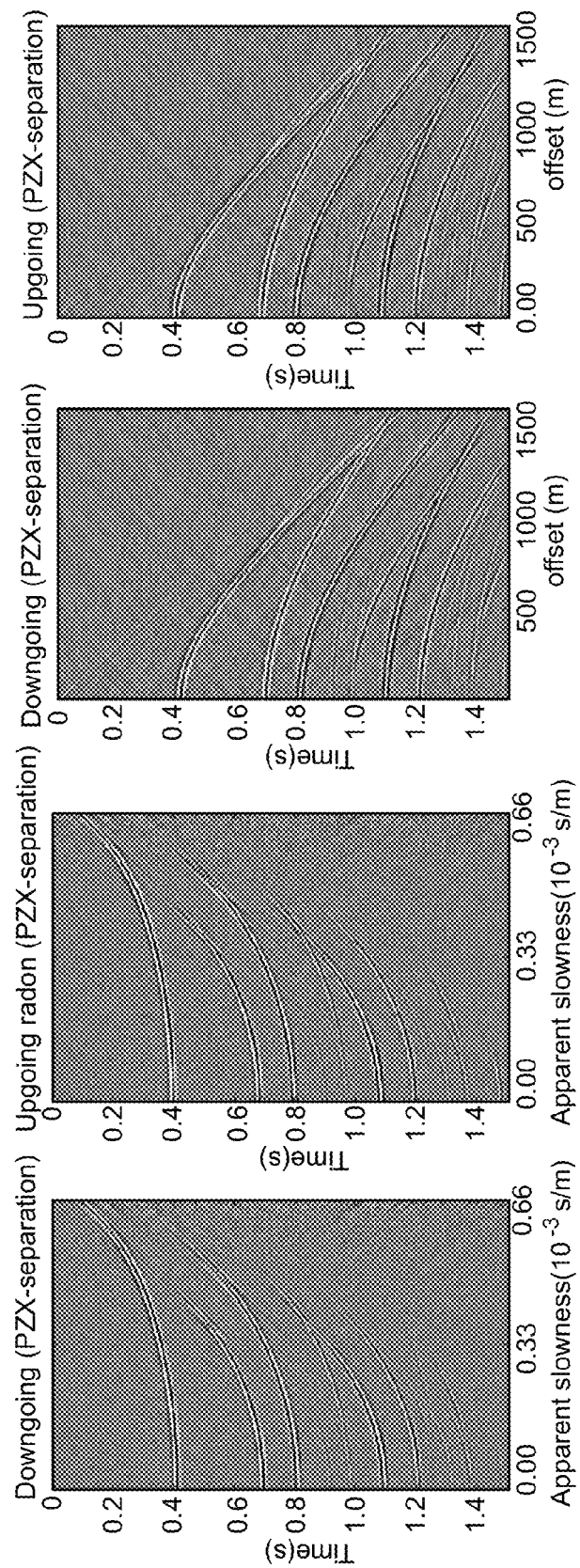

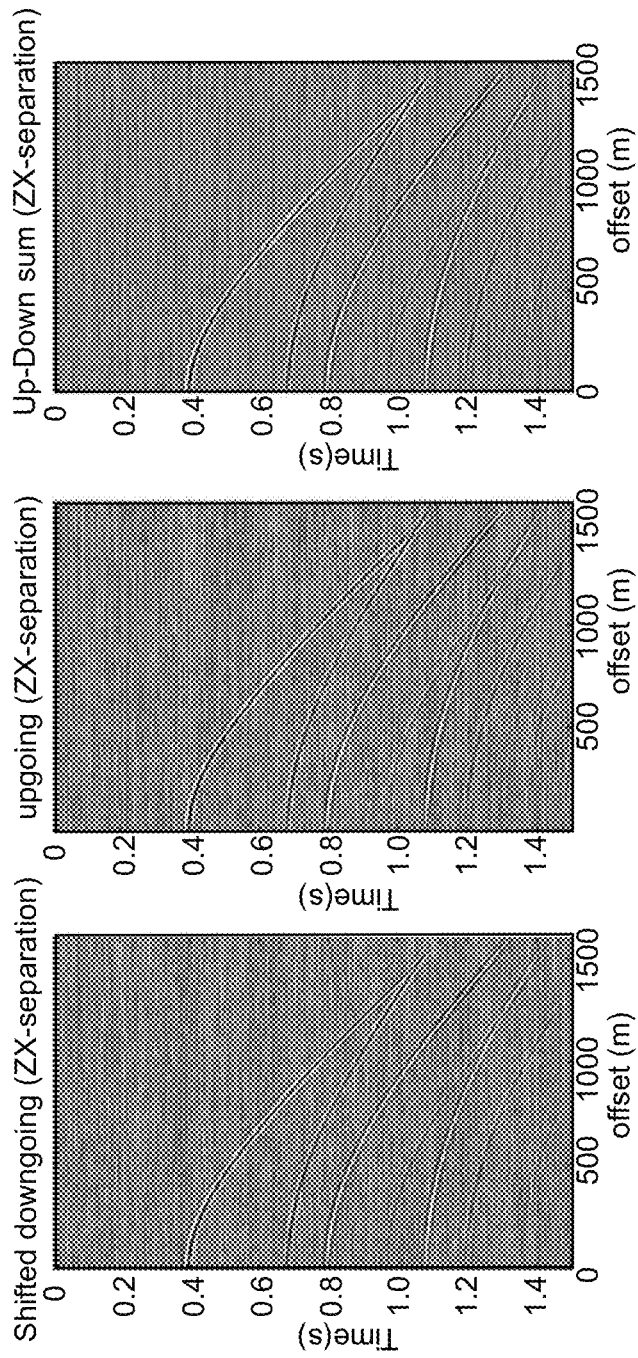

METHOD AND DEVICE FOR WAVE FIELDS SEPARATION IN SEISMIC DATA

BACKGROUND

1. Technical Field

Embodiments of the subject matter disclosed herein generally relate to methods and systems and, more particularly, to mechanisms and techniques for processing seismic data to separate up-going and down-going wave fields recorded by a receiver underwater.

2. Discussion of the Background

In recent years, the interest in developing new oil and gas producing fields has dramatically increased. However, the supply of onshore production is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a well with no or non-commercial quantities of hydrocarbons.

Marine seismic data acquisition and processing generate an image (2-dimensional cross section or 3-dimensional) of the geophysical structure (subsurface) under the seafloor. While this image/profile does not provide a precise location for oil and gas reservoirs, it suggests, to those trained in the field, the presence or absence of the oil and/or gas reservoirs. Thus, providing a high resolution image of the subsurface is an ongoing process for the exploration of natural resources, including, among others, oil and/or gas.

During a seismic gathering process, as shown in FIG. 1, a vessel 10 drags an array of detectors (e.g., hydrophones or geophones or accelerometers) 12. Plural detectors 12 are disposed along a cable 14. Cable 14 together with its corresponding detectors 12 are sometimes referred to, by those skilled in the art, as a streamer 16. The vessel 10 may tow plural streamers 16 at the same time. The streamers may be disposed horizontally, i.e., lying at a constant depth $z_1$ relative to a surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are provided along a slanted straight line 14 making a constant angle α with a reference horizontal line 30.

With reference to FIG. 1, the vessel 10 also drags a sound source 20 configured to generate a seismic wave 22a. The seismic wave 22a propagates downward and penetrates the seafloor 24, eventually being reflected by a reflecting structure 26 (reflector). The reflected seismic wave 22b propagates upwardly and is detected by detector 12. For simplicity, FIG. 1 shows only two paths 22a corresponding to the generated seismic wave. However, the seismic wave emitted by the source 20 may be substantially a spherical wave, e.g., it propagates in all directions starting from the source 20. Disturbances produced by the passing reflected seismic wave 22b (primary) are recorded by the various detectors 12 (the recorded signals are called traces) while disturbances produced by the reflected seismic wave 22c (reflected at the water surface 18) are detected by the detectors 12 at a later time. Since the interface between the water and air is well approximated as a quasi-perfect reflector (i.e., the water surface acts as a mirror for the acoustic or seismic waves), the reflected wave 22c travels back towards the detector 12 as shown by wave 22d in FIG. 1. Wave 22d is normally referred to as a ghost wave because this wave is due to a spurious reflection.

The ghosts are also recorded by the detector 12, but with a different polarization and a time lag relative to the primary wave 22b.

Thus, every arrival of a marine seismic wave at detector 12 is accompanied by a ghost reflection. In other words, ghost arrivals trail their primary arrival and are generated when an upward traveling wave is recorded a first time on submerged equipment before being reflected at the surface-air contact. The now downward propagating reflected wave 22d is recorded a second time at detector 12 and constitutes the ghost. Primary and ghost (receiver side ghost and not the source side ghost) signals are also commonly referred to as up-going and down-going wave fields.

The time delay between an event and its ghost depends entirely upon the depth of the receiver 12 and the wave velocity in water (this can be measured and considered to be approximately 1500 m/s). It can be only a few milliseconds for towed streamer data (depths of less than 15 meters) or up to hundreds of milliseconds for deep Ocean Bottom Cable (OBC) and Ocean Bottom Node (OBN) acquisitions. The degenerative effect that the ghost arrival has on seismic bandwidth and resolution are known. In essence, interference between primary and ghost arrivals causes notches or gaps in the frequency content and these notches cannot be removed without the combined use of advanced acquisition and processing techniques.

One popular technique for separating the up-going and down-going wave fields is called PZ-summation and applies to both OBC/OBN and streamer data. Here, the seismic wave field is recorded using co-located hydrophones (P) and vertical geophones (Z). In other words, the detector 12 shown in FIG. 1 includes two different devices, the hydrophone 32 and the vertically oriented geophone 34. Hydrophones measure pressure whereas geophones measure particle velocity in the direction they are oriented. Data recorded on both receivers is in phase for up-going waves and of opposite phase for down-going waves, or the ghost. Combining both records involves a calibration to remove differences in frequency response, a unit conversion (which depends on the impedance, defined as the product of water density and wave velocity, of the water) and a time-offset dependant scaling to match amplitudes. After these steps the data can be summed or subtracted to produce estimates of the up-going and down-going wave fields respectively.

However, each of the above corrections (spectral matching, unit conversion, and time-offset scaling) has to be estimated and all are prone to errors.

Accordingly, it would be desirable to provide systems and methods that avoid the afore-described problems and drawbacks, e.g., remove interference and improve the usable band width of the data that can be used in subsequent analysis, such as obtaining a final image.

SUMMARY

According to an exemplary embodiment, there is a method for ZX separating up-going and down-going wave fields in seismic data related to a subsurface of a body of water. The method includes a step of receiving as input vertical and radial components, wherein the vertical component is related to a particle velocity measured along a depth direction relative to a surface of the water and the radial component is related to the particle velocity measured along a radial direction parallel to the surface of the water and substantially perpendicular to the depth direction and the radial direction and the vertical direction define a plane in which the wave fields propagate. The method also includes a step of applying a radon transform to the vertical and radial components to transform the vertical and radial components from a time-distance domain to a tau-apparent slowness domain, wherein the apparent slowness is the sine of an incidence angle divided by a speed of the wave fields in water; and a step of calculating the up-going wave fields as a first combination of the radon transformed vertical and radial components multiplied by a scaling factor. The method further includes a step of calculating the down-going wave fields as a second combination of the radon transformed vertical and radial components multiplied by the scaling factor; and applying an inverse radon transform to the up-going wave fields and the down-going wave fields to obtain up-going wave fields and down-going wave fields in the time-distance domain.

According to another exemplary embodiment, there is a method for PZX separating up-going and down-going wave fields in seismic data related to a subsurface of a body of water. The method includes a step of receiving as input vertical and radial components and a hydrophone component, wherein the vertical component is related to a particle velocity measured along a depth direction relative to the surface of the water, the radial component is related to the particle velocity measured along a direction parallel to the surface of the water and substantially perpendicular to the depth direction, the radial direction and the vertical direction define a plane in which the wave fields propagate, and the hydrophone component is related to a pressure measured in the body of water by the hydrophone at a predetermined depth. The method also includes a step of applying a radon transform to the vertical and radial components and to the hydrophone component to transform the vertical and radial components and the hydrophone component from a time-distance domain to a tau-apparent slowness domain, wherein the apparent slowness is the sine of an incidence angle divided by a speed of the wave fields in water; and a step of calculating the up-going wave fields as a first combination of the radon transformed vertical and radial components and the radon transformed hydrophone component, the first combination being multiplied by a scaling factor. The method further includes a step of calculating the down-going wave fields as a second combination of the radon transformed vertical and radial components and the radon transformed hydrophone component, the second combination being multiplied by the scaling factor; and a step of applying an inverse radon transform to the up-going wave fields and the down-going wave fields to obtain up-going wave fields and down-going wave fields in the time-distance domain.

According to still another exemplary embodiment, there is a method for weighted PZX separation of up-going and down-going wave fields in seismic data related to a subsurface of a body of water. The method includes a step of receiving as input vertical and radial components and a hydrophone component, wherein the vertical component is related to a particle velocity measured along a depth direction relative to the surface of the water, the radial component is related to the particle velocity measured along a direction parallel to the surface of the water and substantially perpendicular to the depth direction, the radial direction and the vertical direction define a plane in which the wave fields propagate, and the hydrophone component is related to a pressure measured in the body of water by the hydrophone at a predetermined depth. The method also includes a step of applying a radon transform to the vertical and radial components and to the hydrophone component to transform the vertical and radial components and the hydrophone component from a time-distance domain to a tau-apparent slowness domain, wherein the apparent slowness is the sine of an incidence angle divided by a speed of the wave fields in water; and a step of applying a weighting matrix to the radon transformed vertical and radial components and to the radon transformed hydrophone component, the weighting matrix having a parameter 13 that has a value between 0 and 1. The method further includes a step of calculating the up-going wave fields as a first combination of the radon transformed vertical and radial components and the radon transformed hydrophone component, the first combination being multiplied by a scaling factor; a step of calculating the down-going wave fields as a second combination of the radon transformed vertical and radial components and the radon transformed hydrophone component, the second combination being multiplied by the scaling factor; and a step of applying an inverse radon transform to the up-going wave fields and the down-going wave fields to obtain up-going wave fields and down-going wave fields in the time-distance domain.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 12-14 show data panels in the (t-x) domain for each of the synthetic modeled receivers X (radial), Z (vertical) and P (hydrophone) according to an exemplary embodiment;

FIGS. 15-17 shows data panels in the (tau-p) domain corresponding to FIGS. 12-14, respectively, according to an exemplary embodiment;

FIG. 26 is a flowchart of a method for ZX separating up-going and down-going wave fields according to an exemplary embodiment;

FIGS. 27 and 28 show down-going and up-going wave fields in the radon domain for the apparent slowness according to an exemplary embodiment;

FIGS. 29 and 30 show down-going and up-going wave fields in the (t-x) domain for the offset according to an exemplary embodiment;

FIG. 31 is a flowchart of a method for PZX separating up-going and down-going wave fields according to an exemplary embodiment;

FIGS. 32 and 33 show down-going and up-going wave fields obtained using a weighted separation method from data with no random noise for the apparent slowness according to an exemplary embodiment;

FIGS. 34 and 35 show down-going and up-going wave fields obtained using a weighted separation method from data with random noise for the offset according to an exemplary embodiment;

FIG. 36 is a flowchart of a method for weighted PZX separating up-going and down-going wave fields according to an exemplary embodiment;

FIGS. 37-42 illustrate test data for determining an influence of noise on the separated up-going and down-going wave fields according to an exemplary embodiment;

FIGS. 43-46 illustrate up-going and down-going wave fields estimated by ZX separation according to an exemplary embodiment;

FIGS. 47-50 illustrate up-going and down-going wave fields estimated by PZX separation according to an exemplary embodiment;

FIG. 60 illustrate a time shifted down-going wave field in native offset versus time according to an exemplary embodiment;

FIG. 61 illustrate a radon transformed up-going wave field in native offset versus time according to an exemplary embodiment;

FIG. 62 illustrate a combination of the wave fields shown in FIGS. 60 and 61 according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of ZX, PZX and weighted PZX deghosting algorithms for separating interfering up-going and down-going wave fields that are recorded by the same receivers. However, the embodiments to be discussed next are not limited to these dimensions, but may be extended to the Y direction, where the X, Y and Z directions determine a Cartesian system of reference.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, novel techniques are presented next that achieve up-down separation on marine streamer data. The techniques involve the recording of additional geophone (or other sensors, e.g., accelerometers) channels which measure particle velocity in a horizontal radial direction (X-component) and/or in a horizontal transverse direction (Y-component) besides the vertical direction (Z-component). For simplicity, the following exemplary embodiments are discussed based on a 2 dimensional (2D) assumption so that the Y-component data is not used. However, the exemplary embodiments are applicable not only to 2D geometries but also to 3D geometries (with some modifications) for which the Y-component particle velocities are required.

As the exemplary embodiments to be discussed next introduce novel deghosting techniques, synthetic data is used for illustrating the power of the new techniques. Synthetic data is defined as data generated, for example, on a computer and it is considered to describe a possible subsurface. However, the synthetic data does not include measured data. The exemplary embodiments of deghosting techniques produce wave fields to be used for producing a final image of the subsurface.

Figure 1:
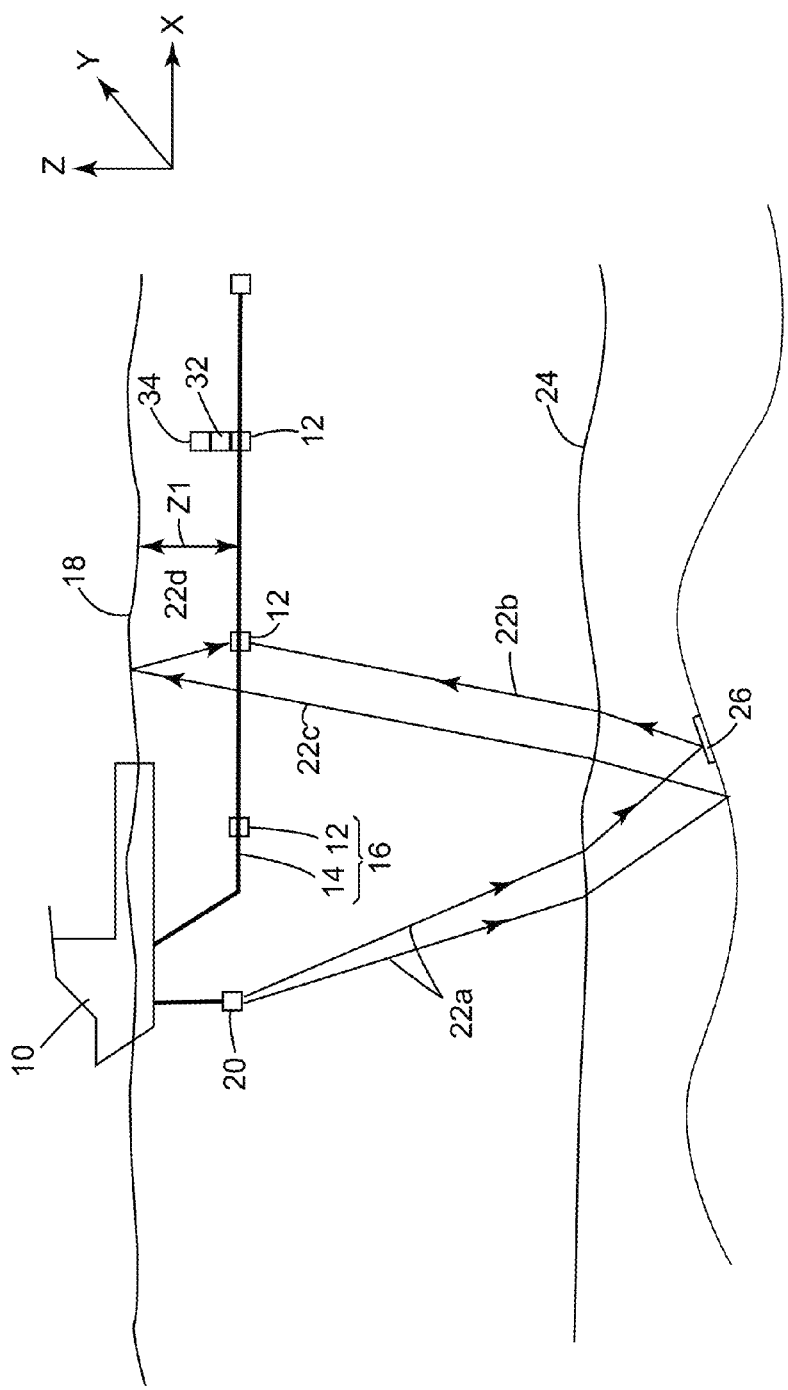
FIG. 1 is a schematic diagram of a conventional seismic data acquisition system having a horizontal streamer.
Figure 2:
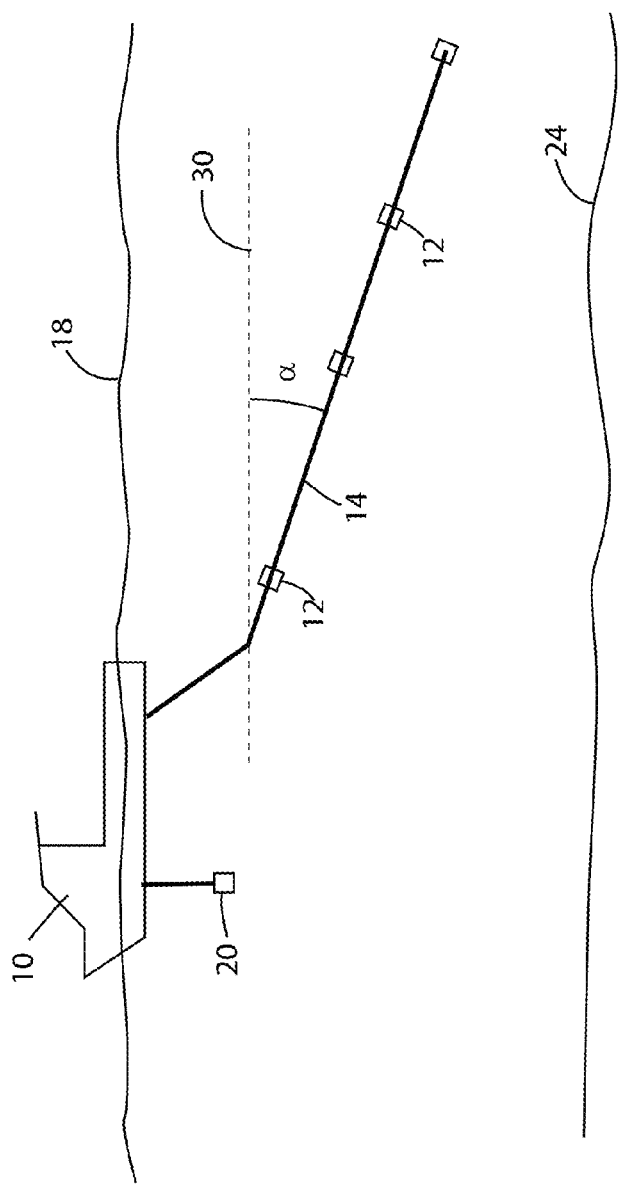
FIG. 2 is a schematic diagram of a conventional seismic data acquisition system having a slanted streamer.
Figure 5:
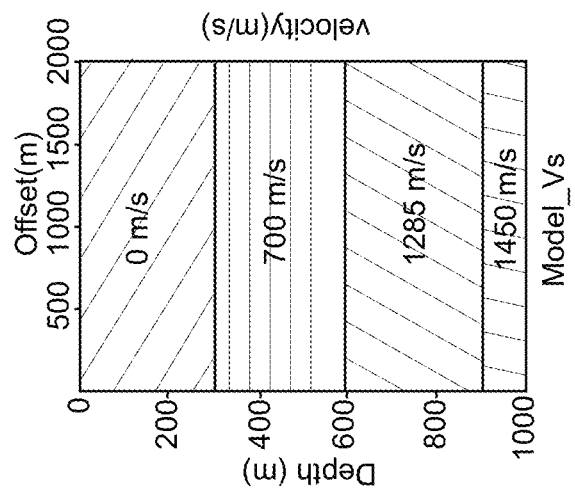
FIGS. 3-5 illustrate synthetic earth model that is used to generate synthetic seismic data.
Figure 4:
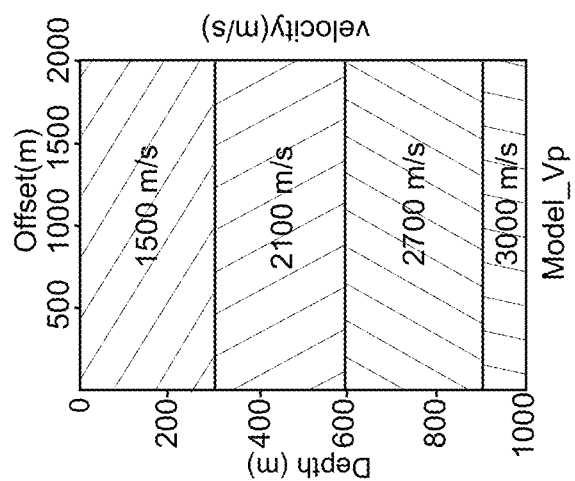
Figure 3:
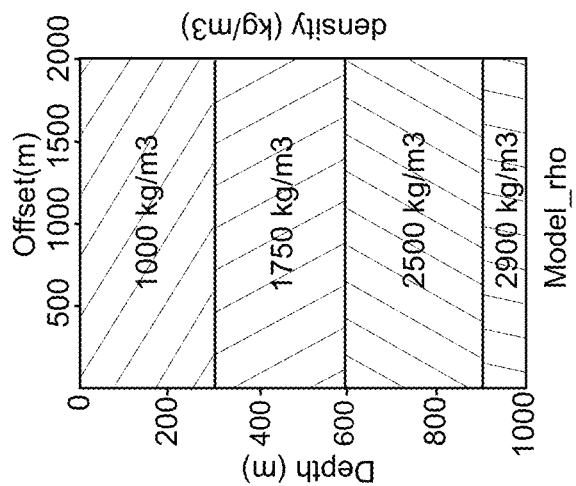
Figure 8:
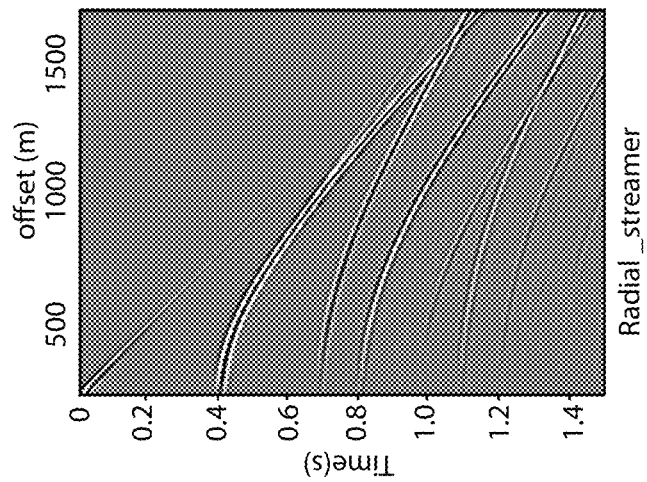
FIGS. 6-8 illustrate synthetic data corresponding to a streamer.
Figure 7:
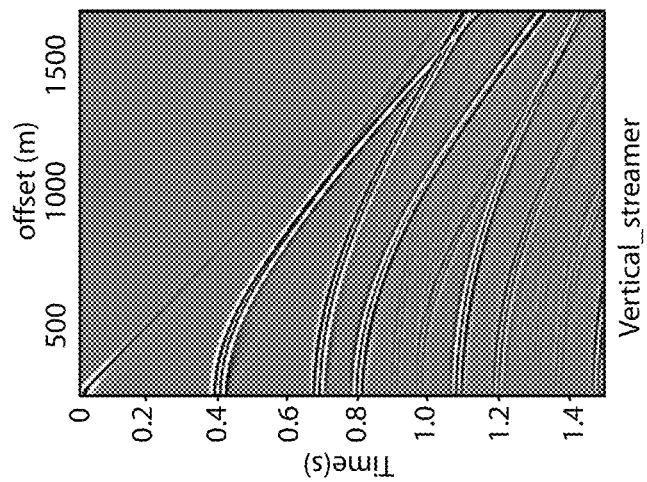
Figure 6:
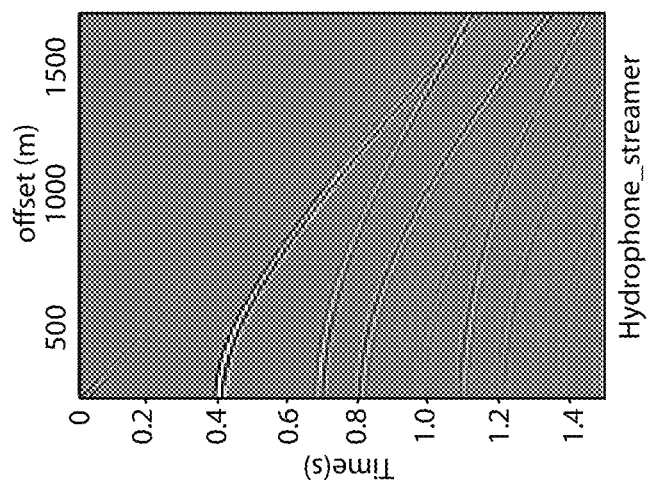

An example of synthetic data is shown in FIGS. 3-5, with FIG. 3 showing the synthetic earth model for a model ρ(where ρ is the density of the earth), FIG. 4 showing the synthetic earth model for a primary wave speed Vp model (P-wave, which is a compressional or longitudinal seismic wave) and FIG. 5 showing the synthetic earth model for a secondary wave speed Vs model (S-wave, which is a transverse or shear seismic wave). The synthetic earth model uses isotropic P and S velocities. The X axis in FIGS. 3-5 illustrates a distance (offset) between a receiver (detector) and a source of the seismic source and the left Y axis illustrates a depth from the surface of the water to a position of the reflector. For FIG. 3, various exemplary densities of the medium along the depth are illustrated, and for FIGS. 4 and 5 various exemplary speeds of the wave in the medium are also illustrated. Based on this model, synthetic data have been generated using a 2D elastic finite difference code (e.g., DELPHII module fdelmodc). The different datasets simulate data recorded on PZX streamers, i.e., streamers having a hydrophone for measuring the pressure P and geophones for measuring the particle velocity along Z and X axes. The streamers are positioned at depths of 10 m. These data are exemplary and not intended to limit the exemplary embodiments. The raw synthetic data for the hydrophones and geophones are illustrated in FIGS. 6-8. These figures illustrate the offset of the receivers on the X axis and a traveling time of the waves from the source to the receivers on the Y axis. FIG. 6 shows the traces recorded by the hydrophone, FIG. 7 shows the traces recorded by the geophone along the Z direction and FIG. 8 shows the traces recorded by the geophone along the X direction. It is noted that a geophone per direction may be used to measure the necessary components. The black and white bands in FIGS.

6-8 represent the recorded seismic wave with the black part representing the pressure increase (hydrophone) and the white part representing the pressure decrease. If a geophone is used, the white and black parts represent particle velocity changes with time.

Figure 9:
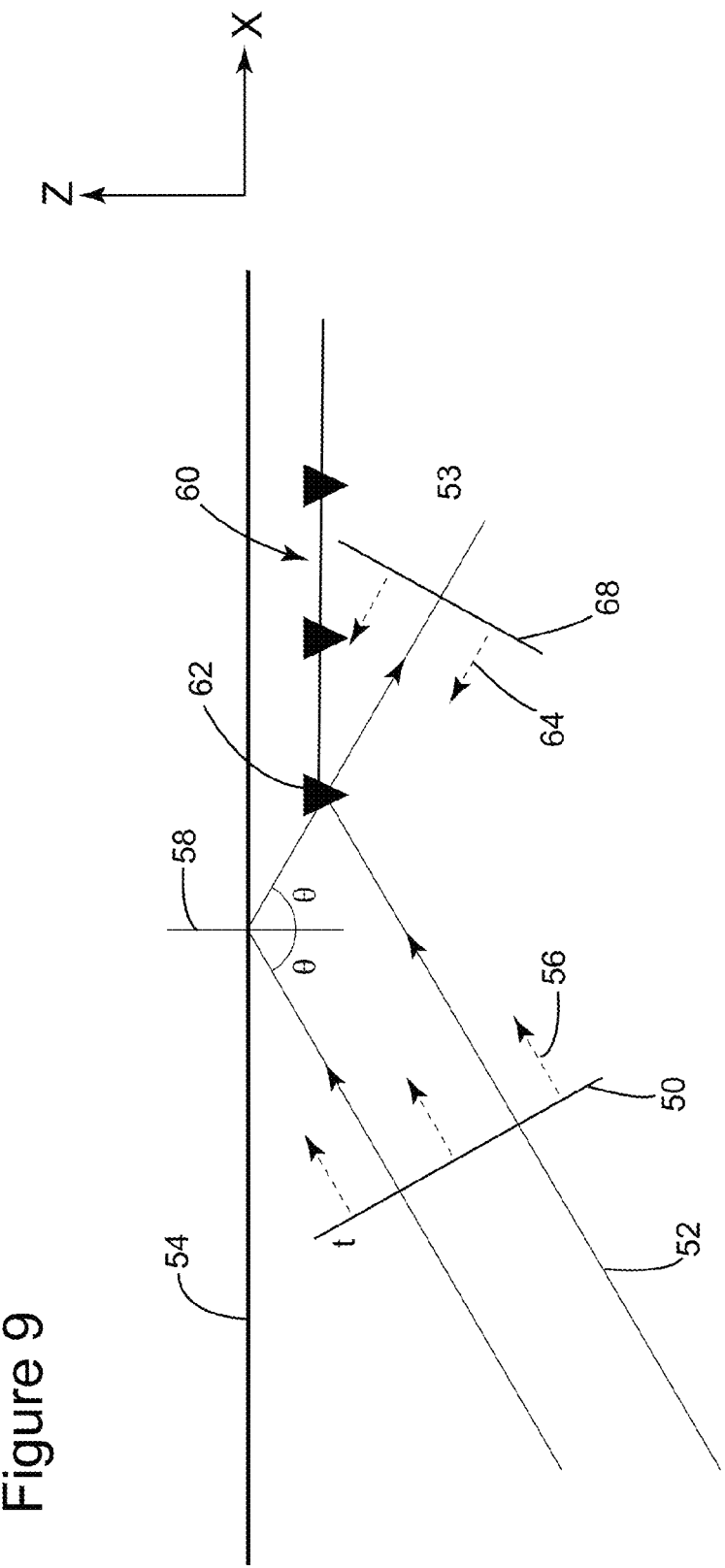
FIG. 9 is a schematic diagram illustrating P-waves underwater, including P-waves reflecting off the sea surface.

For simplicity, a propagating wave is assumed to be a plane wave or it can be decomposed, for example, in a computer, into a collection of plane waves that when added together approximate the recorded wave. Other types of waves may be treated in a similar fashion. Further, the ZX separation for the plane wave is first discussed, then the PZX separation and then the weighted PZX separation. Although the following exemplary embodiments make a plane wave assumption, the present algorithms can be extended to a spherical wave originating at a point source when using a plane-wave decomposition such as the radon transform. FIG. 9 shows plane waves having a planar P-wave wavefront 50. These waves are recorded on a multi-component streamer. A multi-component streamer refers to a streamer with receivers that contain a hydrophone as well as three differently oriented (e.g. orthogonal) geophones or accelerometers.

P-wave rays 52 are shown propagating towards the sea surface 54 and reflected P-wave rays 53 are shown propagating away from the sea surface 54. The P-wave rays 52 form a P-wave wavefront 50. A particle motion direction is indicated by arrow 56. An incidence angle between the P-wave ray 52 and a normal 58 to the sea surface 54 is θ. A streamer 60 having receivers 62 is shown substantially parallel with the sea surface 54. A receiver 62 may include three components, i.e., a hydrophone (P) and two geophones (Z and X). The receiver 62 may also include a fourth component, i.e., another geophone (Y). For simplicity, all these receivers are collectively referred to as receiver 62.

FIG. 9 shows the up-going plane P-wave ray 52 with vector 56 indicating its polarization or particle motion vector. Particle motion 56 is orthogonal to the wave front 50 and pointing up and right in the figure. The plane P-wave is recorded a first time by the submerged receiver 62 and then reflected down at the sea surface 54. This reflection also causes a polarity reversal which is illustrated by FIG. 9 in the polarization vectors 64 that accompany the reflected wave front 68. These vectors 64 now point up and to the left in the figure. The reflected and downwards propagating (ghost) wave is recorded a second time by the submerged receiver 62. FIG. 9 also shows the orientation of axes Z and X relative to the water surface 54 and streamer 60.

Figure 10:
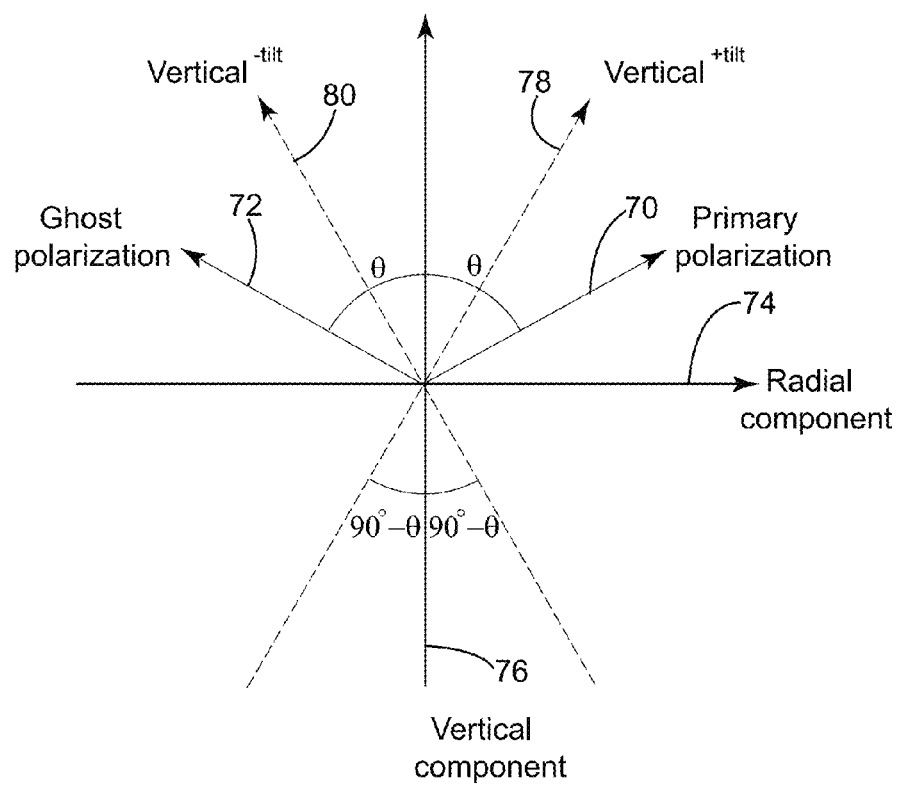
FIG. 10 is a schematic diagram illustrating a system of coordinates in which ZX separation is performed according to an exemplary embodiment.

According to an exemplary embodiment illustrated in FIG. 10, the following notations are introduced for processing the ZX components. The particle velocity vectors 70 and 72 for the primary and ghost events, respectively, are shown with respect to the directions 74 and 76 in which the horizontal (radial) and vertical geophone of a streamer would measure the particle velocity field. In this regard, direction 74 corresponds to direction X and direction 76 corresponds to direction Z of FIG. 9. It is to be noted that vectors 56 and 64 in FIG. 9 indicate particle motion whereas vectors 70 and 72 in FIG. 10 indicate particle velocity. However, these vectors are parallel for a P-wave.

The vertical (V) and radial (R) geophone (or accelerometer or other sensors) components both include projections of the primary (U) and ghost (D) signals arrival at the receiver 62 and these projections of the primary U and ghost D are governed by the wave's ray angle (θ) measured from vertical:

$$V = U\cos\theta + D\cos\theta, \text{ and} \quad (1)$$

$$R = U\sin\theta - D\sin\theta. \quad (2)$$

It is noted that elements V, R, U, and D when written in bold indicate a vector, i.e., each element has multiple time samples. Equations (1) and (2) may be rewritten in matrix form as:

$$\begin{bmatrix} V \\ R \end{bmatrix} = \begin{bmatrix} \cos\theta & \cos\theta \\ \sin\theta & -\sin\theta \end{bmatrix} \begin{bmatrix} U \\ D \end{bmatrix}. \quad (3)$$

Even the matrix form may be rewritten in a more compact notation:

$$d = Am, \quad (4)$$

where d represents the data matrix (what is known/recorded), A is the forward or projection matrix (what can be estimated), and m is the model matrix (things that are not known but are desired to be known). From equation (4), m can be calculated as:

$$m = (A^T A)^{-1} A^T d \quad (5)$$

Because A is a square matrix, it holds that:

$$m = A^{-1} d \quad (6)$$

with $$A^{-1} = \frac{1}{\sin 2\theta} \begin{bmatrix} \sin\theta & \cos\theta \\ \sin\theta & -\cos\theta \end{bmatrix}. \quad (7)$$

Equation (7) determines the expressions for primary (U) and ghost (D) to be:

$$U = \frac{1}{\sin 2\theta}(V\sin\theta + R\cos\theta), \text{ and} \quad (8)$$

$$D = \frac{1}{\sin 2\theta}(V\sin\theta - R\cos\theta). \quad (9)$$

The meaning of these expressions is visualized in FIG. 10. The term (V sin(θ)∓R cos(θ)) (10) in equation (8) defines a signal that would be measured by a geophone in the vertical$^{+tilt}$ direction 78, where tilt=(90−θ). This direction is orthogonal to the ghost polarization 72 and oblique to the primary polarization 70. Hence, a geophone that records particle velocity in the vertical$^{+tilt}$ direction 78 does not record the ghost 72 (because they are perpendicular to each other) and only a scaled version of the primary 70. The scaling is a function of the ray angle θ and equal to sin 2θ, which explains the $$\frac{1}{\sin 2\theta}$$

term in the equations (8) and (9).

Likewise, the term (V sin(θ)−R cos(θ)) in equation (9) defines a signal that would be measured by a geophone oriented in the vertical$^{-tilt}$ direction 80. In this direction, no primary is recorded as the primary 70 is perpendicular on the vertical$^{-tilt}$ direction 80. Only a scaled version of the ghost 72 is recorded by the geophone oriented along the vertical$^{-tilt}$ direction 80 with the scaling again equal to sin 2θ.

Figure 11:
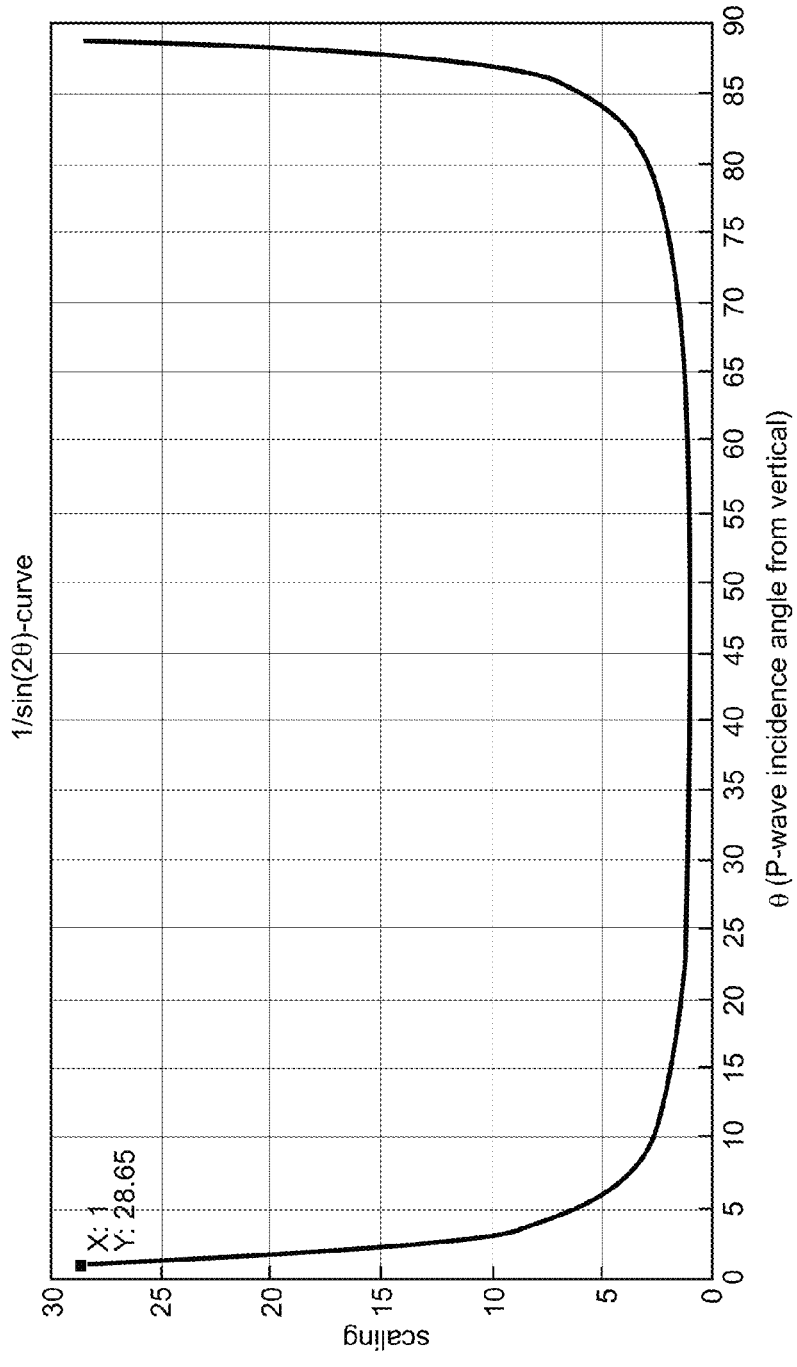
FIG. 11 illustrates a variation of a scaling factor with an incidence angle according to an exemplary embodiment.

The $$\frac{1}{\sin 2\theta}$$

term in equations (8) and (9) provides an estimate of a "penalty" that is incurred for measuring the ghost or primary signal along a direction (vertical$^{-tilt}$, or vertical$^{+tilt}$) that is not parallel to the respective polarizations. FIG. 11 illustrates the values of $$\frac{1}{\sin 2\theta}$$

for different P-wave ray angles θ. If the field data is assumed to have isotropic random noise, then the amount of random noise is equal for any angle θ. The amplitudes of primary (U) and ghost (D) estimates obtained through equations (8) and (9) will however vary with θ and the amount of scaling is inversely proportional to the loss in signal-to-noise.

For θ=45°, the scaling factor $$\frac{1}{\sin 2\theta}$$

equals 1. This means that a maximum signal-to-noise ratio is present. For θ=15°, the scaling factor $$\frac{1}{\sin 2\theta}$$

equals 2. This results in a drop in the signal-to-noise ratio by a factor of 2 when compared to the case of θ=45°. The value of $$\frac{1}{\sin 2\theta}$$

sharply increases for angles less than 10° or greater than 80°, thus leading to increasingly poorer estimates for U and D. For ray angles of 0° and 90°, the ZX separation equations for U and D break down as the scaling factor reaches infinity. In other words, when θ=0°, the P-waves propagate as vertical rays. In this case no P-wave energy is recorded on the X-component whilst all primary and ghost energy is recorded on the vertical geophone. No linear combination between the X and Z components exists that isolates the primary or ghost. The same reasoning applies to horizontally propagating P-waves when θ=90° as the P-wave propagate horizontally and no P-energy is recorded on the Z-component.

However, the seismic data recorded on marine streamers is composed of a full 360° spectrum of ray angles. In order to apply the ZX separation method described above, the large scaling factor around the zero and ninety degrees needs to be addressed. Thus, according to an exemplary embodiment, the seismic data is transformed, prior to applying equations (8) and (9), from the native domain (t-x) into a plane-wave (τ-p) domain, where t represents the recorded time, x the position on the X axis, τ (tau) is an intercept time, and p represents an apparent slowness. Tau and p are parameters to be clarified later. The plane-wave domain is one possible domain for transforming the data. Other domains may be used.

For the synthetic data illustrated in FIGS. 3-8, a radon transform (also known as τ-p transform) may be used to convert the seismic data from the (t-x) domain into the (τ-p) domain. A radon transform is an integral transform including the integral of a function over straight lines. For example, the radon transform decomposes a non-planar wave into a series of plane waves. According to an exemplary embodiment, it is possible to achieve a comparable plane-wave decomposition of the data using curvelets, or other mathematical transformations such as 2 and 3-dimensional Fourier transforms.

FIGS. 12-14 show data panels in the (tau-x) domain for each of the synthetic modeled receivers X (radial), Z (vertical) and P (hydrophone), respectively and FIGS. 15-17 show data panels in the (tau-p) domain corresponding to the FIGS. 12-14. To match geophone and hydrophone amplitudes, the hydrophone data have been calibrated by scaling them with the impedance of the water. The impedance of the water is defined as the product of the density of the water and the longitudinal speed of the wave in water. The data in FIGS. 12-14 were modeled for offsets between 0 and 1600 m. The radon transformed data of each component is shown in FIGS. 15-17, where the vertical axis is the time and the horizontal axis is the apparent slowness (s/m). The apparent slowness p is directly related to the plane P-wave ray angle θ through the P-wave velocity in water $V_{Po}$ as illustrated below:

$$\theta = \sin^{-1}(p * V_{Po}). \qquad (11)$$

It is noted that the apparent slowness becomes the inverse of real velocity $V_{Po}$ for θ=90°. In other words, the apparent slowness may be seen as the projection on X of the real inverse velocity of the wave.

According to an exemplary embodiment, the ZX up-down separation in the radon domain may be achieved by using the expressions (8) and (9) for U and D and varying the ray angle θ according to the slowness. To avoid singularities at angles close to 0° and 90° (slowness of 0 s/m and 6.667 10$^{-4}$ s/m, respectively and assuming a water velocity of 1500 m/s), the scaling coefficient may be stabilized (for eliminating artifacts) leading to the following expressions for U and D for the ZX separation method:

$$U = \frac{1}{\mu \cos^\alpha(2\theta) + \sin(2\theta)}(V\sin\theta + R\cos\theta), \text{ and} \qquad (12)$$

$$D = \frac{1}{\mu \cos^\alpha(2\theta) + \sin(2\theta)}(V\sin\theta - R\cos\theta). \qquad (13)$$

Figures 18, 19, 20, 21:
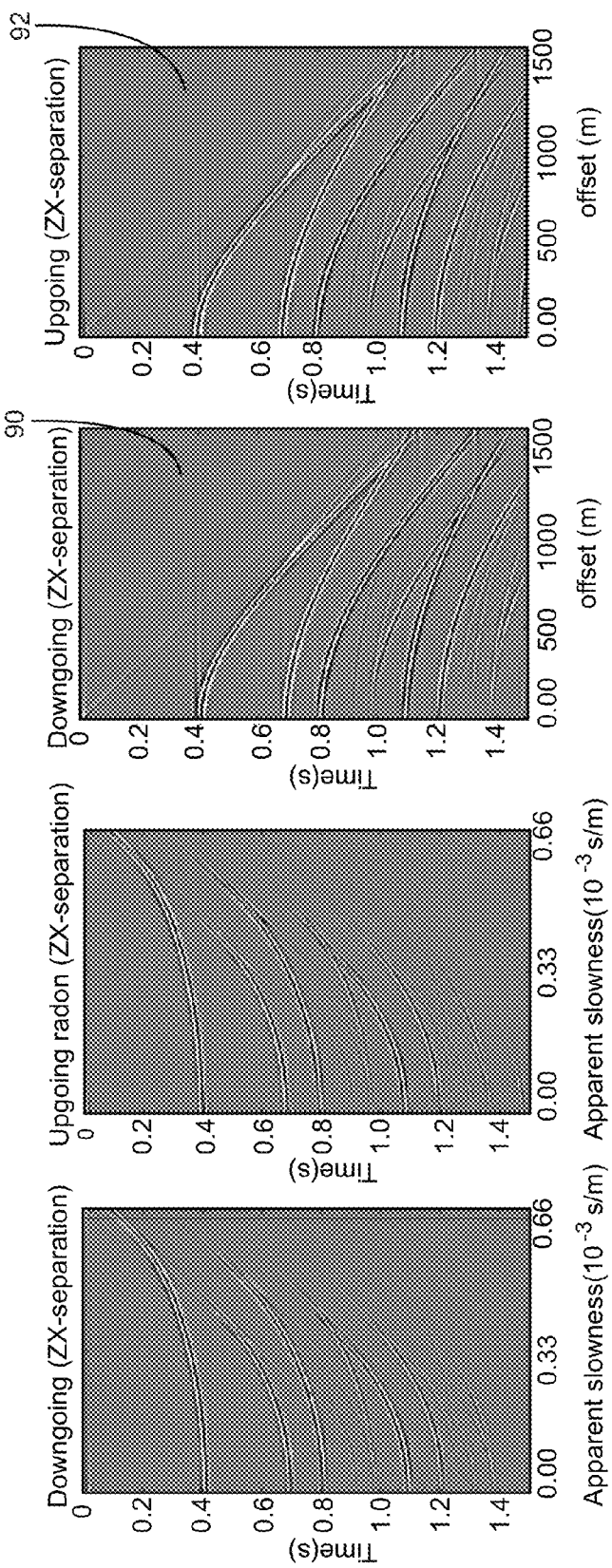
FIGS. 18 and 19 show the down-going and up-going wave fields (ZX separation) for the apparent slowness and FIGS. 20 and 21 show the down-going and up-going wave fields (ZX separation) in the native time-offset domain (t-x domain) according to an exemplary embodiment.

In these expressions, α and μ can be chosen so as to limit the impact of this stabilization factor to only those angles that require it. Examples that are shown next use μ=0.05 and α=10. However, other values may be used. Also, other scaling coefficients may be used, e.g., a constant. Equations (12) and (13) may be used for each trace (slowness) in the vertical and radial radon transformed data, to obtain an estimate of the up-going and down-going signals. The results of applying equations (12) and (13) are shown in FIGS. 18-21, in which FIGS. 18 and 19 show the down-going and up-going wave fields (ZX separation) for the apparent slowness and FIGS. 20 and 21 shows the down-going and up-going wave fields (ZX separation) for the offset. In order to obtain estimates of the up-going and down-going P-wave signals in the (t-x) domain, an inverse radon transform is applied. As shown in FIG. 18-21, the separation of the up-going wave signals from the down-going signals is achieved and thus, the primary and the ghosts may be separated from each other for a better image of the reflector. However, some flat events 90 and 92 are noted and they are discussed later.

Figure 23:
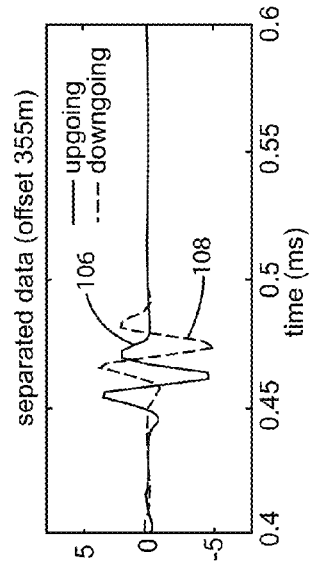
FIG. 23 shows ZX separated data for up-going and down-going wave fields versus time according to an exemplary embodiment.
Figure 22:
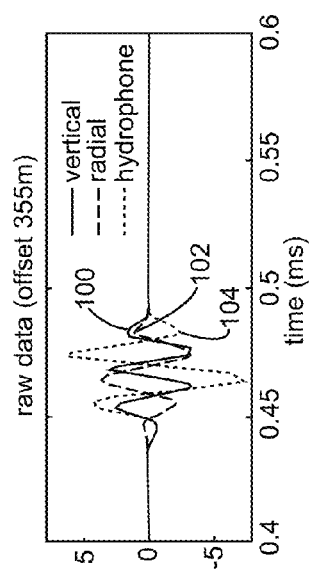
FIG. 22 shows raw data for vertical, radial and hydrophone signals versus time according to an exemplary embodiment.

FIG. 22 compares the vertical 100, radial 102 and hydrophone 104 channels of a single arrival from a receiver with an offset of 355 m with the ZX estimated up-going 106 and down-going 108 signals represented in FIG. 23. Both FIGS. 22 and 23 show the amplitude of signals plotted versus time. The amplitude spectra of the vertical 110, radial 112 and hydrophone 114 channels are also shown in FIG. 24 and the ZX separated up-going 116 and the down-going 118 signals are shown in FIG. 25.

Figure 24:
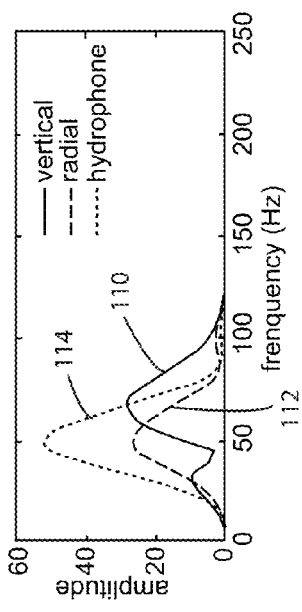
FIG. 24 shows raw data for vertical, radial and hydrophone signals versus frequency according to an exemplary embodiment.
Figures 51, 52, 53, 54:
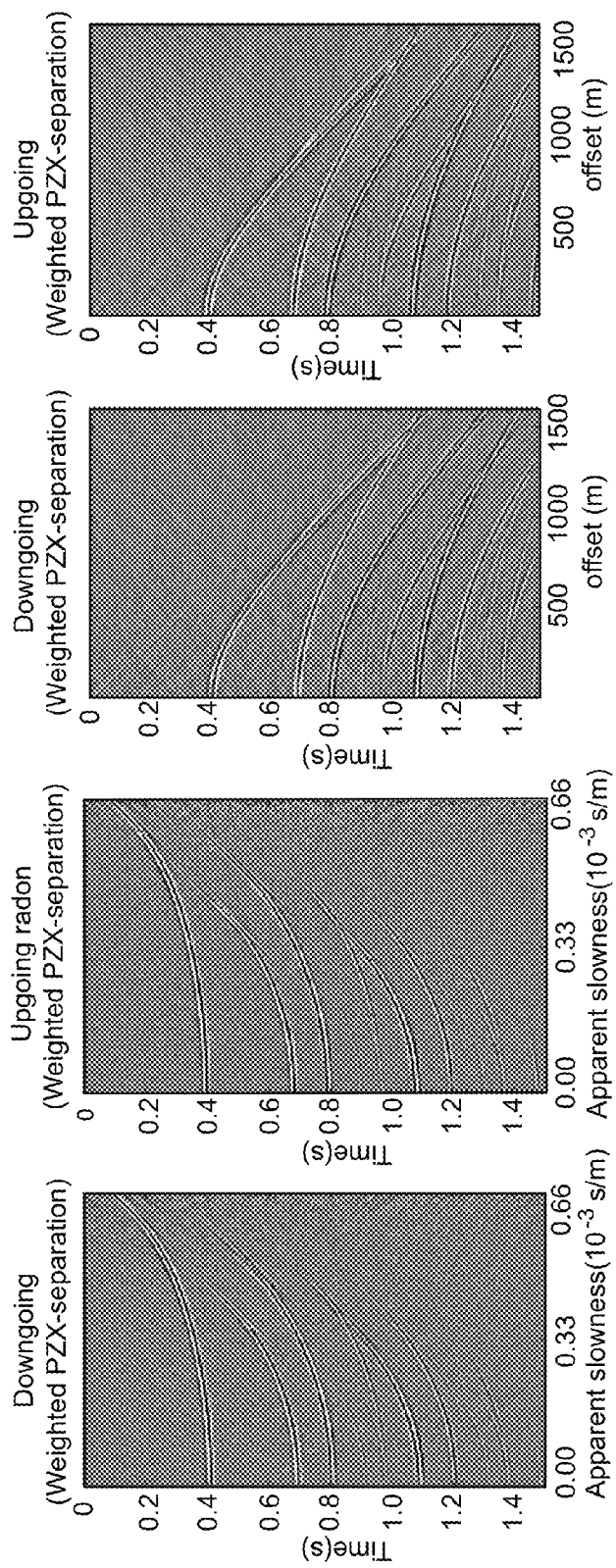
FIGS. 51-54 illustrate up-going and down-going wave fields estimated by weighted PZX separation according to an exemplary embodiment.

Visible on the spectra of the "raw" data shown in FIG. 24 are the notches that are caused by the interference between the primary signal and its ghost. Due to the limited bandwidth of the synthetic signal, only a single notch is observed in the spectrum of the vertical component around 45 Hz and one in the radial component around 90 Hz.

Figure 25:
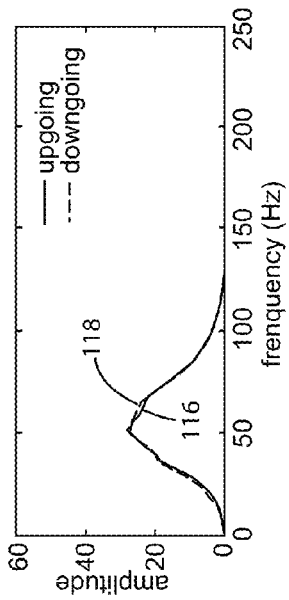
FIG. 25 shows ZX separated data for up-going and down-going wave fields versus frequency according to an exemplary embodiment.

The spectra of the up-going and down-going estimates in FIG. 25 are identical and free of notches. They are also richer in low and high frequencies when compared with the raw spectra of FIG. 24. This is an indication that the ZX separation has successfully recovered the up-going and down-going wave fields.

One interesting aspect with regard to the time series shown in FIGS. 22 and 24 is the similarity between the hydrophone and radial geophone data. Conventional PZ up-down separation works on the basis that notches in the P spectrum occur at different frequencies than for the Z spectrum. Also, it appears that in the ZX up-down separation the X-component fulfils the same task as the P component in PZ separation, but without the need to calibrate the hydrophone channel, which is another advantage of the ZX separation method.

To summarize some advantages of the ZX separation, it is noted that this method does not require calibrations between Z and X components as the conventional PZ up-down separation method. In addition, this method can be applied directly to "raw" data. This is contrary to the conventional PZ method where calibration and matching the geophone and hydrophone frequency responses are important. Moreover, PZ calibration and frequency response matching is often laborious and difficult.

According to an exemplary embodiment illustrated in FIG. 26, there is a method for ZX separating up-going and down-going wave fields in seismic data related to a subsurface of a body of water. The method includes a step 2600 of receiving as input vertical and radial geophone components; a step 2602 of applying a radon transform to the vertical and radial geophone components to transform the vertical and radial geophone components from a time-distance domain to a tau-slowness domain; a step 2604 of calculating the up-going wave fields as a first combination of the radon transformed vertical and radial geophone components multiplied by a scaling factor; a step 2606 of calculating the down-going wave fields as a second combination of the radon transformed vertical and radial geophone components multiplied by the scaling factor; and a step 2608 of applying an inverse radon transform to the up-going wave fields and the down-going wave fields to obtain up-going wave fields and down-going wave fields in the time-distance domain.

However, the ZX separation method also has shortcomings. It was shown earlier that the ZX separation method breaks down for vertical and horizontal ray or wave propagation directions. The modified ZX separation equations, e.g., (12) and (13) include a stabilization factor to avoid these singularities. This fix comes at a cost and artefacts are generated in the separated (t-x) gathers on near offsets and on far offsets at the edge of the gathers. These artefacts appear as the flat events illustrated in FIGS. 18-21, see elements 90 and 92.

The traditional PZ summation is also sensitive to singularities for horizontal ray angles or propagation. The quality of PZ separation results is expected to show a drop in signal-to-noise with an increase in the ray angles from vertical. However, for the PZ summation method, seismic exploration data is always richer in near vertical ray-angles and typically it will not even contain energy that propagates along horizontal rays.

Thus, according to an exemplary embodiment, it is possible to combine the PZ and ZX separation methods into a unified PZX up-down separation method as discussed next. Moreover, the PZX separation is an over-determined system of equations in a least squares sense. This allows the formulation of up-down separation equations that use only the P data to stabilize the ZX solution when needed in an attempt to reduce the impact of calibration and frequency response matching on the result.

Recalling that the ZX separation method is based on equations (1) and (2) with U being the primary or direct signal, D being the ghost signal, V and R representing the data recorded on vertical and radial geophones, and $\theta$ being the P-wave ray angle measured from a vertical (normal), another equation may be added for the data recorded on the hydrophone channel H.

In this equation it is assumed that a calibration of the geophone-hydrophone response matching has been performed. As the hydrophones are insensitive to the ray direction, the following relation holds:

$$H = U - D. \quad (14)$$

It is noted the similarity between the equations for H and R. These equations are identical with the exception of a "$-\sin(\theta)$" scaling. In matrix notation, equations (1), (2) and (14) yield:

$$\begin{bmatrix} V \\ R \\ H \end{bmatrix} = \begin{bmatrix} \cos\theta & \cos\theta \\ \sin\theta & -\sin\theta \\ 1 & -1 \end{bmatrix} \begin{bmatrix} U \\ D \end{bmatrix}, \quad (15)$$

which can be written in a more compact notation:

$$d = Am. \quad (16)$$

Equation (16) represents an over-determined least squares problem the solution of which is:

$$m = (A^T A)^{-1} A^T d, \quad (17)$$

where:

$$(A^T A)^{-1} A^T = \frac{1}{2} \begin{bmatrix} \frac{1}{\cos\theta} & \frac{\sin\theta}{1+\sin^2\theta} & \frac{1}{1+\sin^2\theta} \\ \frac{1}{\cos\theta} & \frac{-\sin\theta}{1+\sin^2\theta} & \frac{-1}{1+\sin^2\theta} \end{bmatrix}. \quad (18)$$

Using equation (18), the following expressions for primary (U) and ghost (D) may be derived:

$$U = 0.5 \left( V \frac{1}{\cos\theta} + R \frac{\sin\theta}{1+\sin^2\theta} + H \frac{1}{1+\sin^2\theta} \right), \text{ and} \quad (19)$$

$$D = 0.5 \left( V \frac{1}{\cos\theta} - R \frac{\sin\theta}{1+\sin^2\theta} - H \frac{1}{1+\sin^2\theta} \right). \quad (20)$$

The resulting estimates (19) and (20) for the up-going and down-going wave fields in both the radon domain and the (t-x) domain are shown in FIGS. 27-30. FIGS. 27 and 28 show the down-going and up-going wave fields in the radon domain for the apparent slowness (PZX separation) and FIGS. 29 and 30 show the down-going and up-going wave fields in the (t-x) domain for the offset. When comparing the results from the ZX separation shown in FIGS. 18-21 with the results of the PZX separation shown in FIGS. 27-30, it is observed an improvement in the last results, e.g., in the (t-x) plots of FIGS. 29 and 30 there are no horizontal artifacts on near offsets or far offsets at the edge of the gathers.

As noted above, by combining data from hydrophones, vertical and radial geophones, an over-determined system is generated. In other words, there are more data available than necessary in order to estimate the up-going and down-going wave fields. One benefit of having an over-determined system is that a choice is available for what data are to be used and also a choice is available of when in the separation process to use what data.

According to an exemplary embodiment illustrated in FIG. 31, there is a method for PZX separating up-going and down-going wave fields in seismic data related to a subsurface of a body of water. The method includes a step 3100 of receiving as input vertical and radial geophone components and a hydrophone component; a step 3102 of applying a radon transform to the vertical and radial geophone components and to the hydrophone component to transform the vertical and radial geophone components and the hydrophone component from a time-distance domain to a tau-slowness domain; a step 3104 of calculating the up-going wave fields as a first combination of the radon transformed vertical and radial geophone components and the radon transformed hydrophone component, the first combination being multiplied by a scaling factor; a step 3106 of calculating the down-going wave fields as a second combination of the radon transformed vertical and radial geophone components and the radon transformed hydrophone component, the second combination being multiplied by the scaling factor; and a step 3108 of applying an inverse radon transform to the up-going wave fields and the down-going wave fields to obtain up-going wave fields and down-going wave fields in the time-distance domain.

For instance, the PZX separation equations may be modified as will be discussed next so that they resemble the ZX results when good quality radial data are available. The modified PZX separation to be discussed next is referred to as weighted PZX separation. Further, the proposed modifications stabilize the solutions when using hydrophone data for P-values close to 0 (e.g., when there is no useful signal on the radial geophone component). This can be achieved through, for example, weighting a least squares by choosing an appropriate weighting matrix W.

In an exemplary embodiment, the following weighting matrix W may be used:

$$W = \begin{bmatrix} \frac{1}{\sqrt{2+\beta^2}} & 0 & 0 \\ 0 & \frac{1}{\sqrt{2+\beta^2}} & 0 \\ 0 & 0 & \frac{\beta}{\sqrt{2+\beta^2}} \end{bmatrix}. \tag{21}$$

In this matrix, $0 \le \beta \le 1$ so that the squares of the diagonal of W add up to unity. Weights for the horizontal and vertical geophone are identical. For $\beta=0$, the hydrophone weight is zero, meaning that the hydrophone channel is ignored, thus resulting in the previously discussed ZX separation method. When $\beta=1$, the weighting matrix W is the identity matrix and the previous, non-weighted solution for PZX separation, is obtained. However, other matrices may be used having the same or different parameters as the matrix (21).

Thus, by using matrix W, equation (17) becomes:

$$m = (A^T W A)^{-1} A^T W d \tag{22}$$

in which W is the weight matrix. A generic weight matrix is desirable to be diagonal, a sum of the squares of the diagonal elements is one.

The right hand part of equation (22) may be written as:

$$(A^T W A)^{-1} A^T W = \frac{1}{2} \begin{bmatrix} \frac{1}{\cos\theta} & \frac{\sin\theta}{(\beta+\sin^2\theta)} & \frac{\beta}{(\beta+\sin^2\theta)} \\ \frac{1}{\cos\theta} & -\frac{\sin\theta}{(\beta+\sin^2\theta)} & -\frac{\beta}{(\beta+\sin^2\theta)} \end{bmatrix}. \tag{23}$$

If the parameter $\beta$ is chosen to be $\cos^2(\theta)$, then equation (23) becomes:

$$(A^T W A)^{-1} A^T W = \frac{1}{2} \begin{bmatrix} \frac{1}{\cos\theta} & \sin\theta & \cos^2\theta \\ \frac{1}{\cos\theta} & -\sin\theta & -\cos^2\theta \end{bmatrix}. \tag{24}$$

Using equation (24), the following expressions for the primary (U) and ghost (D) may be obtained for the weighted PZX separation method:

$$U = 0.5\left(V\frac{1}{\cos\theta} + R\sin\theta + H\cos^2\theta\right), \text{ and} \tag{25}$$

$$D = 0.5\left(V\frac{1}{\cos\theta} - R\sin\theta - H\cos^2\theta\right). \tag{26}$$

It is noted that by calculating the primary and the ghost by equations (25) and (26), the contribution from the hydrophone channel goes to zero as $\theta$ becomes larger and more useful signals are recorded on the radial geophone. This weighted PZX separation can therefore also be considered a blended PZ (small p-values) and ZX (large p-values) up-down separation where the hydrophone channel is used to stabilize the ZX separation at near offsets or small p-values. The results of the PZX summation using equations (25) and (26) are shown in FIGS. 32-35. FIGS. 32 and 33 show the down-going and the up-going wave fields from data with no random noise for the apparent slowness and FIGS. 34 and 35 show the same wave fields in the time-distance domain. In the absence of (random) noise, the results of FIGS. 32 to 35 are identical to the non weighted PZX separation results of FIGS. 27 to 30. Frequency dependant weights are also possible.

According to an exemplary embodiment illustrated in FIG. 36, there is a method for weighted PZX separation of up-going and down-going wave fields in seismic data related to a subsurface of a body of water. The method includes a step 3600 of receiving as input vertical and radial geophone components and a hydrophone component; a step 3602 of applying a radon transform to the vertical and radial geophone components and to the hydrophone component to transform the vertical and radial geophone components and the hydrophone component from a time-distance domain to a tau-slowness domain; a step 3604 of applying a weighting matrix to the radon transformed vertical and radial geophone components and to the radon transformed hydrophone component, the weighting matrix having a parameter β that has a value between 0 and 1; a step 3606 of calculating the up-going wave fields as a first combination of the radon transformed vertical and radial geophone components and the radon transformed hydrophone component, the first combination being multiplied by a scaling factor; a step 3608 of calculating the down-going wave fields as a second combination of the radon transformed vertical and radial geophone components and the radon transformed hydrophone component, the second combination being multiplied by the scaling factor; and a step 3610 of applying an inverse radon transform to the up-going wave fields and the down-going wave fields to obtain up-going wave fields and down-going wave fields in the time-distance domain.

However, the actual data (obtained through a field experiment) collected from the receivers includes random noise. To determine the impact of the random noise on the performance of the ZX, PZX and weighted PZX separation methods discussed above, test data is generated as shown in FIGS. 37-42. The test data is displayed in both the (t-x) and radon domains. The ZX, PZX and weighted PZX estimates of the up-going and down-going wave fields, based on the test data shown in FIGS. 37-42 is illustrated in FIGS. 43-54, with FIGS. 43-46 corresponding to the ZX separation, FIGS. 47-50 corresponding to the PZX separation, and FIGS. 51-54 corresponding to the weighted PZX separation.

Based on FIGS. 34-54, it is noted the un-weighted and weighted PZX results (FIGS. 47 to 54) are similar, as the amount of random noise on P, Z and X traces is the same.

The PZX results are noticeably different from the ZX separation results in FIGS. 43-46. For slowness values less than 0.15 s/km there is more random noise in the ZX results. In the (t-x) domain this noise is visible as horizontal striping.

The weighted and un-weighted PZX results are not affected by increased random noise levels for low slowness values for reasons that were discussed previously. Increased levels of random looking noise can be observed at large slowness values close to 0.66 s/km. Note that this noise can also be observed in the ZX results, but it is of lower amplitude than the noise at small slowness values. In the (t-x) domain the noise in the PZX results appears as striping with both positive and negative slowness of around 0.66 s/km and −0.66 s/km. The noise with negative slowness is introduced by the radon transform that was used.

Having introduced the ZX, PZX and weighted PZX separation methods, next is discussed the possibility of adding together the up-going and the down-going wave fields instead of removing the down-going (ghost) wave fields. Conventionally, up-down separation on towed streamer data is mainly concerned with obtaining a good estimate of the up-going wave field. The down-going or ghost wave-fields are sometimes not even computed or discarded without further use. According to an exemplary embodiment, it is possible to recombine the separated primary and ghost wave fields to boost the overall signal-to-noise ratio of the final image.

Combining or summing up the up-going and down-going wave fields involves a correction for arrival time differences as the down-going wave fields arrive later to the receiver than the up-going wave fields. This is happening because the down-going wave has travelled further and will therefore arrive after the up-going wave. The time delay is a function of (1) a streamer depth, (2) a ray angle and (3) a near-surface velocity of the wave.

Figure 55:
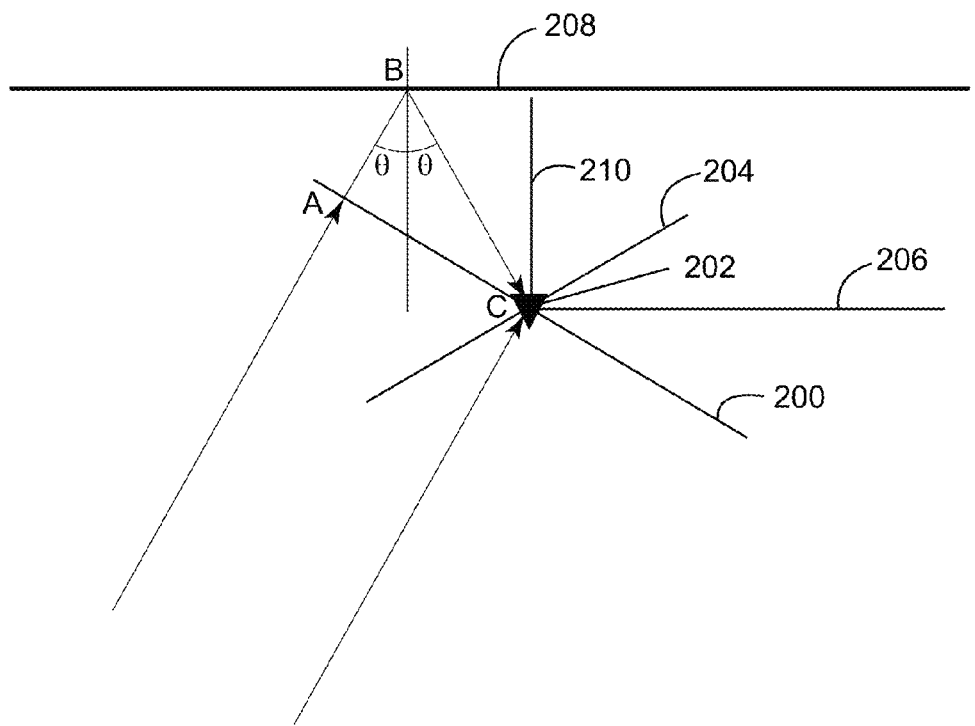
FIG. 55 is a schematic diagram of a traveling path of a ghost signal according to an exemplary embodiment.

For plane waves there exists a simple expression for the time delay between the primary and ghost arrival. FIG. 55 shows that as soon as the primary wavefront 200 arrival is recorded at receiver 202, the wave has to propagate over a distance |AB|+|BC| before the arrival of the ghost 204 is recorded. This is true for any receiver 202 within a streamer 206 if a reflection occurs on a flat sea surface 208 and if the streamer 206 is towed at constant depth 210 (or, if the streamer is slanted or has another geometry, these equations need to be modified accordingly). The time-delay $\Delta t_\theta$ between the primary and the ghost is the distance |AB|+|BC| divided by the P-wave velocity in water $V_P$:

$$\Delta t_\theta = \frac{|AB|+|BC|}{V_P} = \frac{|BC|\cos 2\theta + |BC|}{V_P} = \frac{z(\cos 2\theta + 1)}{V_P \cos \theta}. \tag{27}$$

In equation (27), z represents the streamer depth in meters. This equation can be further simplified to:

$$\Delta t_\theta = \frac{2z \cos \theta}{V_P}. \tag{28}$$

Figure 56:
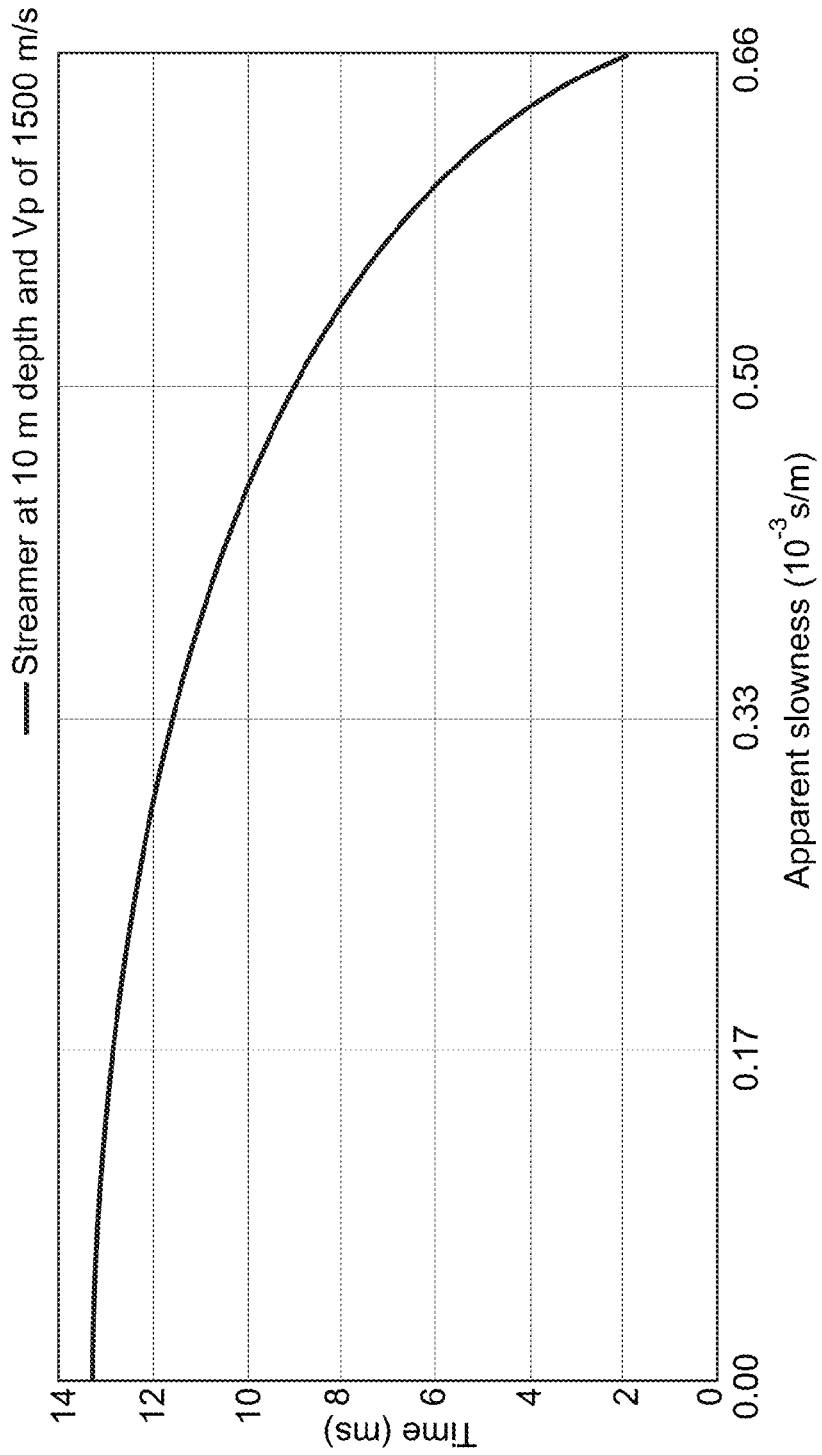
FIG. 56 is a graph illustrating a time shift dependence with an apparent slowness according to an exemplary embodiment.
Figures 57, 58, 59:
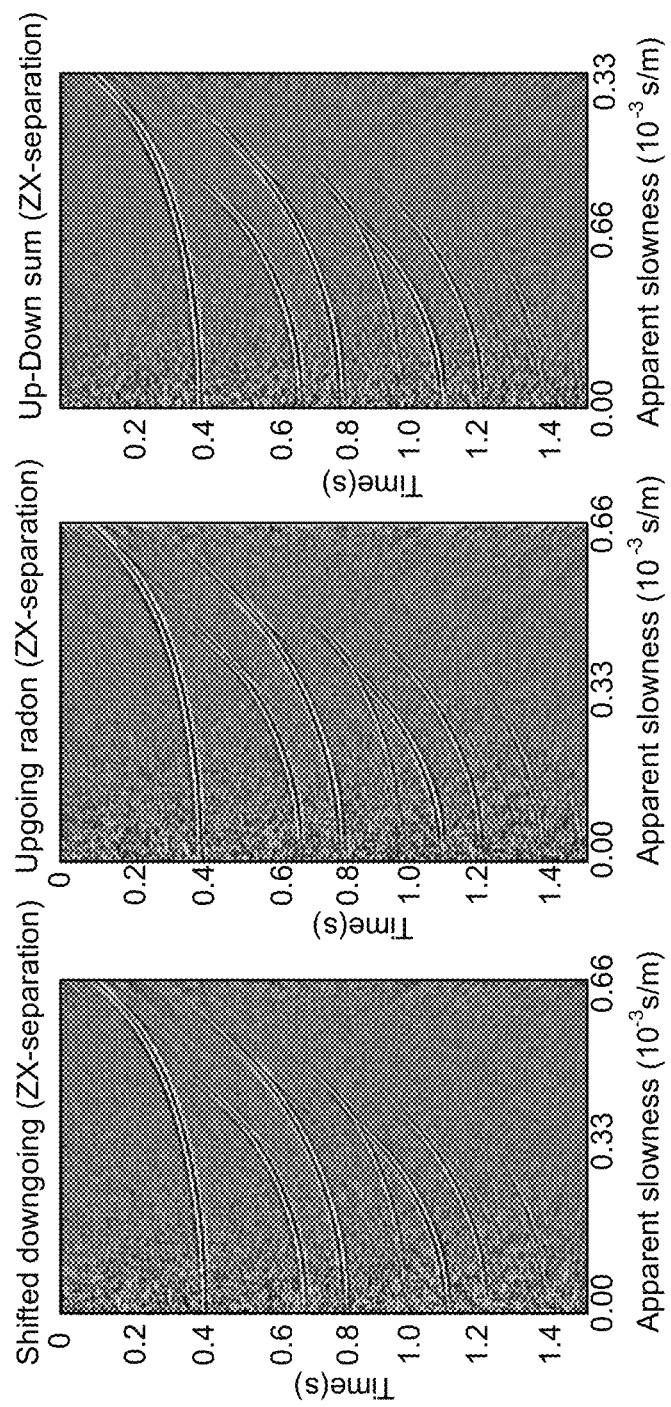
FIG. 57 illustrate a time shifted down-going wave field estimate in the radon domain according to an exemplary embodiment.
FIG. 58 illustrate an up-going wave field estimate in the radon domain according to an exemplary embodiment.
FIG. 59 illustrate a combination of the wave fields shown in FIGS. 57 and 58 according to an exemplary embodiment.

A ray-angle dependant time shift can be applied in the radon domain where each trace relates to a specific value of slowness or θ. FIG. 56 shows time shifts on the Y axis as a function of slowness on the X axis for the synthetic example with a streamer depth of 10 meters and a $V_P$ of 1500 m/s. When these time shifts are applied to the down-going wave-field estimates, arrival times of the down-going wave field estimates should match those of the up-going wave-field estimates and the two estimates can be summed to improve the overall signal-to-noise ratio of the final image. FIGS. 57-59 show the result of applying angle dependant time-shifts on the ZX separation estimates from noisy data (see FIGS. 43-46). FIG. 57 shows the time-shifted down-going wave field estimate, FIG. 58 shows the original up-going wave-field estimate and FIG. 59 shows the half sum of both the time-shifted down-going wave field and the original up-going wave field. The halve sum is used to match the signal amplitudes in all gathers. FIGS. 60-62 show the resulting (t-x) gathers. It is noted that the noise in the summed gathers of FIG. 62 is reduced compared to the up-going and down-going estimates of FIGS. 60 and 61, which demonstrates that using both the down-going and up-going wave fields is advantageous.

Figure 63:
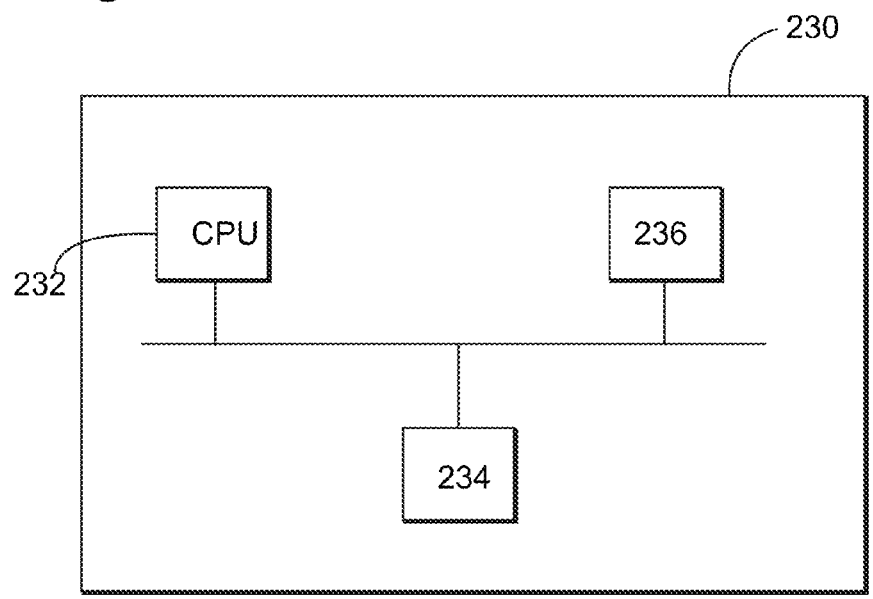
FIG. 63 is a schematic diagram of an apparatus configured to run various separation methods according to an exemplary embodiment.

The above discussed methods may be implemented into an apparatus, e.g., a computer, in software or a combination thereof. Such an apparatus 230 is illustrated in FIG. 63 and may include a processor 232 for performing the processing discussed above and a monitor 234 for displaying the results of the processing. The apparatus 230 may also include a storage device 236 for storing necessary instructions and/or data. Apparatus 230 may include other components as known by those skilled in the arts, e.g., input/output interface, modem, internet connection, etc. In one application, the apparatus 230 is a server and includes between tens and thousands of processors 232 and storage devices 236. It is noted that apparatus 230 is a specific device as the processing of the input data discussed above requires such a specialized device.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for ZX separating up-going and down-going wave fields in seismic data related to a subsurface of a body of water, the method comprising:
   receiving as input vertical and radial components, wherein the vertical component is related to a particle velocity measured along a depth direction relative to a surface of the water and the radial component is related to the particle velocity measured along a radial direction parallel to the surface of the water and substantially perpendicular to the depth direction and the radial direction and the vertical direction define a plane in which the wave fields propagate;
   applying a radon transform to the vertical and radial components to transform the vertical and radial components from a time-distance domain to a tau-apparent slowness domain, wherein the apparent slowness is the sine of an incidence angle divided by a speed of the wave fields in water;
   calculating the up-going wave fields as a first combination of the radon transformed vertical and radial components multiplied by a scaling factor;
   calculating the down-going wave fields as a second combination of the radon transformed vertical and radial components multiplied by the scaling factor; and
   applying an inverse radon transform to the up-going wave fields and the down-going wave fields to obtain up-going wave fields and down-going wave fields in the time-distance domain.

2. The method of claim 1, wherein the input vertical and radial components are determined from geophone or accelerometer sensors.

3. The method of claim 2, wherein the geophone or accelerometer sensors are provided under water at a given depth.

4. The method of claim 1, wherein the up-going wave fields U are given by:

$$U = s(V\sin(\theta) + R\cos(\theta)),$$

where V is the vertical component, R is the radial component, θ is an angle between a line substantially perpendicular to the surface of the water and a direction of propagation of the up-going wave fields U, and s is the scaling factor and it is equal to $$\frac{1}{\sin 2\theta}.$$

5. The method of claim 1, wherein the up-going wave fields U are given by:

$$U = \frac{1}{\mu\cos^\alpha(2\theta) + \sin(2\theta)}(V\sin\theta + R\cos\theta),$$

where μ and α are predetermined parameters.

6. The method of claim 5, wherein μ and α are parameters selected to avoid singularities at angles θ around 0° and 90° for a predetermined water velocity.

7. The method of claim 1, wherein the down-going wave fields D are given by:

$$D = s(V\sin(\theta) - R\cos(\theta)),$$

where V is the vertical component, R is the radial component, θ is an angle between a line substantially perpendicular to the surface of the water and a direction of propagation of the down-going wave fields D, and s is the scaling factor and it is equal to $$\frac{1}{\sin 2\theta}.$$

8. The method of claim 1, wherein the down-going wave fields D are given by:

$$D = \frac{1}{\mu\cos^\alpha(2\theta) + \sin(2\theta)}(V\sin\theta - R\cos\theta),$$

where μ and α are predetermined parameters.

9. The method of claim 8, wherein μ and α are parameters selected to avoid singularities at angles θ around 0° and 90° for a given water velocity.

10. The method of claim 1, further comprising:
   calculating a time shift $$\Delta t_\theta = \frac{2z\cos\theta}{V_P}$$

for each of the down-going wave fields, where z is a depth of a receiver that records the input data, θ is an angle between a line substantially perpendicular to the surface of the water and a direction of propagation of the down-going wave fields, and $V_p$ is a speed in water of the down-going wave fields;
   time shifting the down-going wave fields with a corresponding calculated time shift;
   adding together the up-going wave fields and the time shifted down-going wave fields; and
   generating a final image of the subsurface based on the added wave fields.

11. A method for PZX separating up-going and down-going wave fields in seismic data related to a subsurface of a body of water, the method comprising:
   receiving as input vertical and radial components and a hydrophone component, wherein the vertical component is related to a particle velocity measured along a depth direction relative to the surface of the water, the radial component is related to the particle velocity measured along a direction parallel to the surface of the water and substantially perpendicular to the depth direction, the radial direction and the vertical direction define a plane in which the wave fields propagate, and the hydrophone component is related to a pressure measured in the body of water by the hydrophone at a predetermined depth;

applying a radon transform to the vertical and radial components and to the hydrophone component to transform the vertical and radial components and the hydrophone component from a time-distance domain to a tau-apparent slowness domain, wherein the apparent slowness is the sine of an incidence angle divided by a speed of the wave fields in water;

calculating the up-going wave fields as a first combination of the radon transformed vertical and radial components and the radon transformed hydrophone component, the first combination being multiplied by a scaling factor;

calculating the down-going wave fields as a second combination of the radon transformed vertical and radial components and the radon transformed hydrophone component, the second combination being multiplied by the scaling factor; and applying an inverse radon transform to the up-going wave fields and the down-going wave fields to obtain up-going wave fields and down-going wave fields in the time-distance domain.

12. The method of claim 11, wherein the input vertical and radial components are determined from geophone or accelerometer sensors.

13. The method of claim 11, wherein the up-going wave fields U are given by $$U = 0.5\left(V\frac{1}{\cos\theta} \mp R\frac{\sin\theta}{1+\sin^2\theta} + H\frac{1}{1+\sin^2\theta}\right),$$

where V is the radon transformed vertical component, R is the radon transformed radial component, H is the radon transformed hydrophone component, and $\theta$ is an angle between a line substantially perpendicular to the surface of the water and a direction of propagation of the up-going wave fields U.

14. The method of claim 11, wherein the down-going wave fields D are given by:

$$D = 0.5\left(V\frac{1}{\cos\theta} - R\frac{\sin\theta}{1+\sin^2\theta} - H\frac{1}{1+\sin^2\theta}\right),$$

where V is the radon transformed vertical component, R is the radon transformed radial component, H is the radon transformed hydrophone component, and $\theta$ is an angle between a line substantially perpendicular to the surface of the water and a direction of propagation of the down-going wave fields D.

15. The method of claim 11, where the vertical component, the radial component, and the hydrophone component are measured and the up-going and down-going wave fields are calculated.

16. The method of claim 11, further comprising:
calculating a time shift $$\Delta t_\theta = \frac{2z\cos\theta}{V_P}$$

for each of the down-going wave fields, where z is a depth of a receiver that records the input data, $\theta$ is an angle between a line substantially perpendicular to the surface of the water and a direction of propagation of the down-going wave fields, and $V_p$ is a speed in water of the down-going wave fields;

time shifting the down-going wave fields with a corresponding calculated time shift;

adding together the up-going wave fields and the time shifted down-going wave fields; and generating a final image of the subsurface based on the added wave fields.

17. A method for weighted PZX separation of up-going and down-going wave fields in seismic data related to a subsurface of a body of water, the method comprising:

receiving as input vertical and radial components and a hydrophone component, wherein the vertical component is related to a particle velocity measured along a depth direction relative to the surface of the water, the radial component is related to the particle velocity measured along a direction parallel to the surface of the water and substantially perpendicular to the depth direction, the radial direction and the vertical direction define a plane in which the wave fields propagate, and the hydrophone component is related to a pressure measured in the body of water by the hydrophone at a predetermined depth;

applying a radon transform to the vertical and radial components and to the hydrophone component to transform the vertical and radial components and the hydrophone component from a time-distance domain to a tau-apparent slowness domain, wherein the apparent slowness is the sine of an incidence angle divided by a speed of the wave fields in water;

applying a weighting matrix to the radon transformed vertical and radial components and to the radon transformed hydrophone component, the weighting matrix having a parameter $\beta$ that has a value between 0 and 1;

calculating the up-going wave fields as a first combination of the radon transformed vertical and radial components and the radon transformed hydrophone component, the first combination being multiplied by a scaling factor;

calculating the down-going wave fields as a second combination of the radon transformed vertical and radial components and the radon transformed hydrophone component, the second combination being multiplied by the scaling factor; and applying an inverse radon transform to the up-going wave fields and the down-going wave fields to obtain up-going wave fields and down-going wave fields in the time-distance domain.

18. The method of claim 17, wherein the up-going wave fields U are given by $$U = 0.5\left(V\frac{1}{\cos\theta} + R\sin\theta + H\cos^2\theta\right),$$

where V is the radon transformed vertical component, R is the radon transformed radial component, H is the radon transformed hydrophone component, θ is an angle between a line substantially perpendicular to the surface of the water and a direction of propagation of the up-going wave fields U, and β is equal to $\cos^2(\theta)$.

19. The method of claim 17, wherein the down-going wave fields D are given by:

$$D = 0.5\left(V\frac{1}{\cos\theta} - R\sin\theta - H\cos^2\theta\right),$$

where V is the radon transformed vertical component, R is the radon transformed radial component, H is the radon transformed hydrophone component, θ is an angle between a line substantially perpendicular to the surface of the water and a direction of propagation of the down-going wave fields D, and β is equal to $\cos^2(\theta)$.

20. The method of claim 17, wherein the weighting matrix is diagonal, and a sum of the squares of the diagonal elements is one.

21. The method of claim 17, wherein if β=0, the hydrophone weight is zero and the up-going and down-going wave fields take into account only the vertical and radial components and if β=1, the weighting matrix is one and the method is similar to an unweighted PZX method.

22. The method of claim 17, further comprising:
calculating a time shift $$\Delta t_\theta = \frac{2z\cos\theta}{V_P}$$

for each of the down-going wave fields, where z is a depth of a receiver that records the input data, θ is an angle between a line substantially perpendicular to the surface of the water and a direction of propagation of the down-going wave fields, and $V_p$ is a speed in water of the down-going wave fields;
time shifting the down-going wave fields with a corresponding calculated time shift;
adding together the up-going wave fields and the time shifted down-going wave fields; and
generating a final image of the subsurface based on the added wave fields.

* * * * *